(12) United States Patent
Christensen

(10) Patent No.: US 10,151,520 B2
(45) Date of Patent: Dec. 11, 2018

(54) FOOD AND BEVERAGE COOLER SYSTEM

(71) Applicant: Nodak Coolers, Inc., Gladstone, ND (US)

(72) Inventor: Gordon L. Christensen, Gladstone, ND (US)

(73) Assignee: Nodak Coolers, Inc., Gladstone, ND (US)

( * ) Notice: Subject to any disclaimer, the term of this patent is extended or adjusted under 35 U.S.C. 154(b) by 10 days.

(21) Appl. No.: 15/464,795

(22) Filed: Mar. 21, 2017

(65) Prior Publication Data

US 2018/0274837 A1    Sep. 27, 2018

(51) Int. Cl.
| | |
|---|---|
| *B65D 81/38* | (2006.01) |
| *B65D 25/28* | (2006.01) |
| *F25D 3/06* | (2006.01) |
| *F25D 23/02* | (2006.01) |
| *F25D 23/04* | (2006.01) |
| *F25D 23/06* | (2006.01) |
| *B65D 25/04* | (2006.01) |
| *B65D 43/16* | (2006.01) |
| *B65D 51/28* | (2006.01) |

(Continued)

(52) U.S. Cl.
CPC ............... *F25D 3/06* (2013.01); *A47G 23/02* (2013.01); *B62B 1/14* (2013.01); *B62B 1/16* (2013.01); *B62B 5/067* (2013.01); *B65D 25/04* (2013.01); *B65D 25/2841* (2013.01); *B65D 25/42* (2013.01); *B65D 43/163* (2013.01); *B65D 45/02* (2013.01); *B65D 51/28* (2013.01); *B65D 81/3823* (2013.01); *B65D 85/72* (2013.01); *F25D 23/026* (2013.01); *F25D 23/04* (2013.01); *F25D 23/069* (2013.01); *B62B 2204/06* (2013.01); *B65D 2231/00* (2013.01); *B65D 2255/00* (2013.01); *B65D 2525/286* (2013.01); *B65D 2543/00231* (2013.01); *B65D 2543/00851* (2013.01); *F25D 2400/38* (2013.01)

(58) Field of Classification Search
CPC .. A47G 23/02; B62B 1/14; B62B 1/16; B62B 5/067; B65D 25/04; B65D 25/2841; B65D 25/42
USPC ................ 220/669, 675, 770, 771; 224/324; D9/432
See application file for complete search history.

(56) References Cited

U.S. PATENT DOCUMENTS

| | | |
|---|---|---|
| 590,993 A | 10/1897 | Lochmann |
| 1,096,572 A | 5/1914 | Stoffel |

(Continued)

*Primary Examiner* — J. Gregory Pickett
*Assistant Examiner* — Niki M Eloshway
(74) *Attorney, Agent, or Firm* — Neustel Law Offices

(57) ABSTRACT

A cooler for maintaining food, beverage containers and/or consumable liquids in a thermally managed state. The cooler generally includes a housing having one or more cavities, a cover to selectively close or open the cavities and a plurality of tie down notches within the exterior portion of the housing to receive an elongated fastener for tying down the cooler. The cooler may include a first cavity that receives a food container and a second cavity that receives beverage containers. The first cavity may also store a liquid, such as water, that is dispensed from a spigot connected to the housing. A first cover and a second cover selectively close and open the cavities. The first cover includes a first access opening that removably receives the food container so the first cover doesn't have to be opened to retrieve the food container and its contents.

20 Claims, 21 Drawing Sheets

(51) Int. Cl.
*A47G 23/02* (2006.01)
*B65D 85/72* (2006.01)
*B65D 45/02* (2006.01)
*B65D 25/42* (2006.01)
*B62B 1/16* (2006.01)
*B62B 5/06* (2006.01)
*B62B 1/14* (2006.01)

(56) References Cited

U.S. PATENT DOCUMENTS

| | | | |
|---|---|---|---|
| 3,591,194 A * | 7/1971 | Vega | F25D 3/06 |
| | | | 220/259.2 |
| 3,641,785 A | 2/1972 | Portz | |
| 4,093,327 A * | 6/1978 | Linger | A47B 95/02 |
| | | | 16/443 |
| 5,139,299 A * | 8/1992 | Smith | B65F 1/0066 |
| | | | 220/23.4 |
| 5,323,903 A * | 6/1994 | Bush | B65D 19/0018 |
| | | | 206/386 |
| 5,551,558 A * | 9/1996 | Bureau | A45C 9/00 |
| | | | 190/11 |
| 6,053,345 A * | 4/2000 | Jones | B65D 21/0231 |
| | | | 206/511 |
| 6,912,867 B2 | 7/2005 | Busick | |
| 7,150,163 B1 | 12/2006 | McAllister | |
| 8,393,493 B1 | 3/2013 | Christensen | |
| D712,720 S | 9/2014 | Seiders | |
| D712,721 S | 9/2014 | Seiders | |
| D712,722 S | 9/2014 | Seiders | |
| D712,723 S | 9/2014 | Seiders | |
| D714,125 S | 9/2014 | Seiders | |
| 8,910,819 B2 | 12/2014 | Seiders | |
| D722,474 S | 2/2015 | Seiders | |
| D722,475 S | 2/2015 | Seiders | |
| D727,457 S | 4/2015 | Seiders | |
| D731,614 S | 6/2015 | Seiders | |
| D732,348 S | 6/2015 | Seiders et al. | |
| D732,349 S | 6/2015 | Seiders et al. | |
| D732,350 S | 6/2015 | Seiders et al. | |
| D732,899 S | 6/2015 | Seiders et al. | |
| 9,139,352 B2 | 9/2015 | Seiders et al. | |
| D741,673 S | 10/2015 | Seiders et al. | |
| D741,674 S | 10/2015 | Seiders et al. | |
| D741,919 S | 10/2015 | Seiders et al. | |
| D741,920 S | 10/2015 | Seiders et al. | |
| 9,187,232 B2 | 11/2015 | Seiders | |
| D752,347 S | 3/2016 | Seiders et al. | |
| D752,397 S | 3/2016 | Seiders et al. | |
| 9,476,638 B1 * | 10/2016 | Tyler | F25D 31/005 |
| 2002/0195471 A1 * | 12/2002 | Nottingham | B01F 15/00733 |
| | | | 222/570 |
| 2003/0139169 A1 * | 7/2003 | Arreazola, Jr. | H04B 1/086 |
| | | | 455/344 |
| 2006/0065655 A1 * | 3/2006 | Taylor | A45C 7/0036 |
| | | | 220/6 |
| 2006/0261111 A1 * | 11/2006 | McCoy | B60R 9/065 |
| | | | 224/499 |
| 2008/0156027 A1 | 7/2008 | Jeong et al. | |
| 2010/0314898 A1 * | 12/2010 | Hawkinson | B60P 1/64 |
| | | | 296/37.6 |
| 2011/0290792 A1 * | 12/2011 | Krzak | B65D 81/3816 |
| | | | 220/1.5 |

* cited by examiner

10,151,520 B2

FOOD AND BEVERAGE COOLER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a food and beverage cooler system for maintaining food, beverage containers and consumable liquids in a thermally managed state.

Related Art

Any discussion of the related art throughout the specification should in no way be considered as an admission that such related art is widely known or forms part of common general knowledge in the field.

Conventional coolers are designed to temporarily store a consumable product at a cool temperature for an extended period of time. Examples of consumable products used in conventional coolers are food (e.g. sandwiches), beverage containers (e.g. canned beverages, bottled beverages) and consumable liquids (e.g. drinking water, sports drinks). Conventional coolers are comprised of a single compartment that stores the food, beverage containers or consumable liquid. Often times ice is included with the food, beverage containers or consumable liquid to help maintain a desired cooler temperature of the same in the interior of the cooler. Coolers come in various shapes, sizes and materials. The exterior wall portions, floor and cover of conventional coolers are typically insulated with an insulating material (e.g. foam insulation), gas or vacuum spacing.

While conventional coolers are suitable for usage in maintaining the temperature of a single type of consumable product, conventional coolers are not designed to adequately store multiple types of consumable products.

SUMMARY

An example embodiment is directed to a food and beverage cooler system. The food and beverage cooler system includes a housing having one or more cavities, a cover to selectively close or open the cavities and a plurality of tie down notches within the exterior portion of the housing to receive an elongated fastener for tying down the cooler. The cooler may include a first cavity that receives a food container and a second cavity that receives beverage containers. The first cavity may also store a liquid, such as water, that is dispensed from a spigot connected to the housing. A first cover and a second cover selectively close and open the cavities. The first cover includes a first opening that removably receives the food container so the first cover doesn't have to be opened to retrieve the food container and its contents.

There has thus been outlined, rather broadly, some of the embodiments of the food and beverage cooler system in order that the detailed description thereof may be better understood, and in order that the present contribution to the art may be better appreciated. There are additional embodiments of the food and beverage cooler system that will be described hereinafter and that will form the subject matter of the claims appended hereto. In this respect, before explaining at least one embodiment of the food and beverage cooler system in detail, it is to be understood that the food and beverage cooler system is not limited in its application to the details of construction or to the arrangements of the components set forth in the following description or illustrated in the drawings. The food and beverage cooler system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
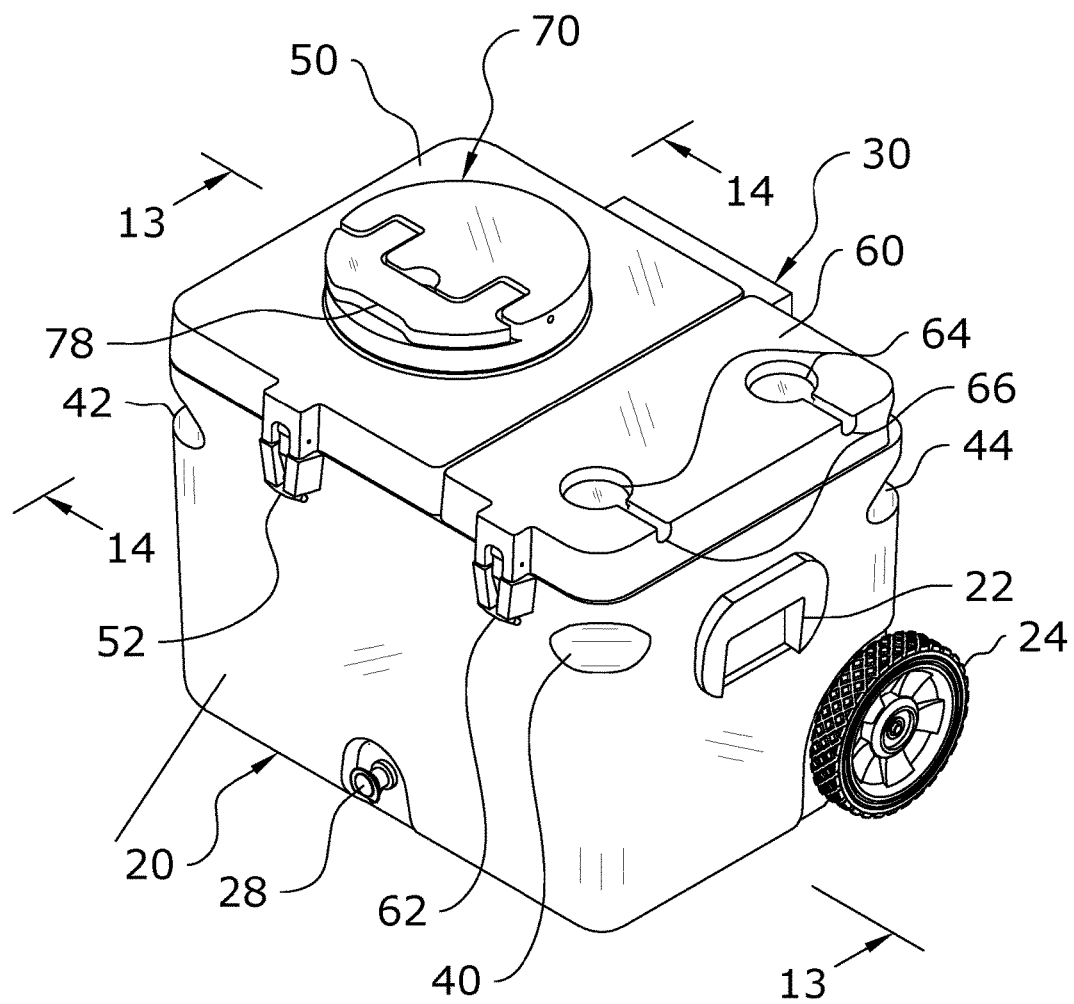
FIG. 1 is a front perspective view of a food and beverage cooler system in accordance with an example embodiment.

An example food and beverage cooler system generally comprises a housing 20 having one or more cavities, a cover to selectively close or open the cavities and a plurality of tie down notches within the exterior portion of the housing 20 to receive an elongated fastener 12 for tying down the cooler. The cooler may include a first cavity 23 that receives a food container 70 and a second cavity 25 that receives beverage containers. The first cavity 23 may also store a liquid, such as water, that is dispensed from a spigot 28 connected to the housing 20. A first cover 50 and a second cover 60 selectively close and open the cavities. The first cover 50 includes a first opening that removably receives the food container 70 so the first cover 50 doesn't have to be opened to retrieve the food container 70 and its contents.

B. Housing

In an embodiment, the housing 20 preferably includes a floor, a front wall extending upwardly from a front portion of the floor, a rear wall extending upwardly from a rear portion of the floor, a left wall extending upwardly from a left portion of the floor between the front wall and the rear wall, and a right wall extending upwardly from a right portion of the floor between the front wall and the rear wall forming a rectangular shaped structure as illustrated in FIGS. 1 through 20 of the drawings. While various different rectangular shaped housings 20 are illustrated in FIGS. 1 through 20 of the drawings, the housing 20 may be comprised of other shapes such as, but not limited to, circular, oval, polygonal, triangular and the like.

At least a portion of the housing 20 is preferably insulated or constructed of insulating material as is done with conventional coolers. The housing 20 may be constructed of various types of materials including, but not limited to, plastic, metal, composite and the like. The usage of foam insulating material within the housing 20 may also be used to reduce the thermal conduction between the cavity within the housing 20 and the atmosphere surrounding the housing 20.

An upper edge is formed the front wall, the rear wall, the left wall and the right wall. The height of the upper edge is preferably consistent along the entire upper edge, however, different heights at different portions of the upper edge may be used. In an embodiment of the cooler, the upper edge is substantially rectangular shaped as illustrated in FIGS. 12, 15, 17, 19 and 20 of the drawings. The upper edge defines an upper opening within the housing 20 that is fluidly connected to the one or more cavities within the housing 20.

C. Cavities

The one or more cavities are formed by the floor, the front wall, the rear wall, the left wall and the right wall in the embodiment shown in the figures. The number of cavities formed depends upon the desired application, storage requirements and other factors relevant to the cooler. The main cavity defined by the floor, the front wall, the rear wall, the left wall and the right wall is sealed to prevent leakage of fluids from the cavity outside of the housing 20 (and also prevents debris and other undesirable substances from entering the cavity from outside of the housing 20). Ice, reusable ice packs or other cold objects may be added to either or all of the cavities within the housing 20 to help keep the contents inside at a desirable cooler temperature than outside of the housing 20.

Figure 12:
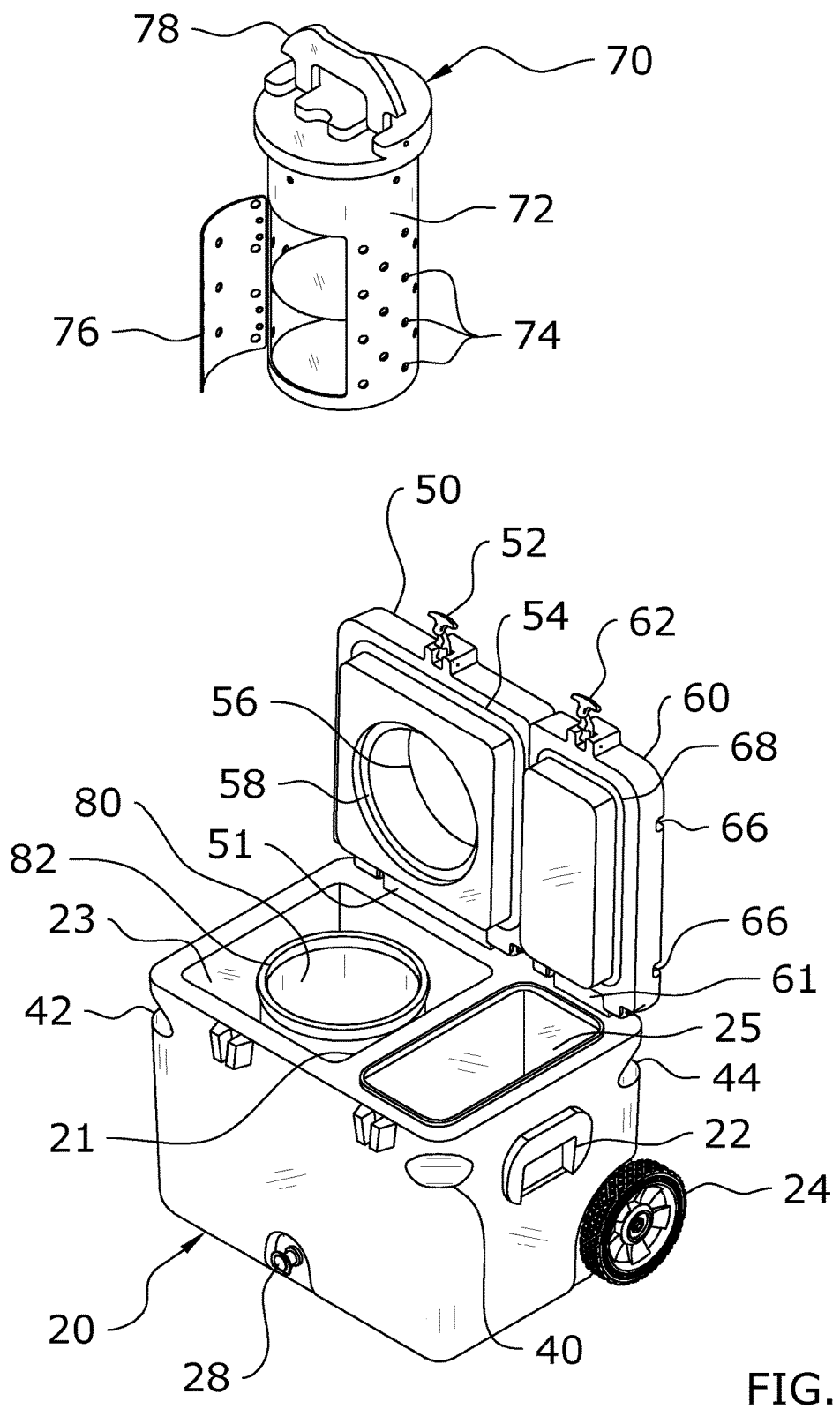
FIG. 12 is an exploded front perspective view of a food and beverage cooler system in accordance with an example embodiment.
Figure 13:
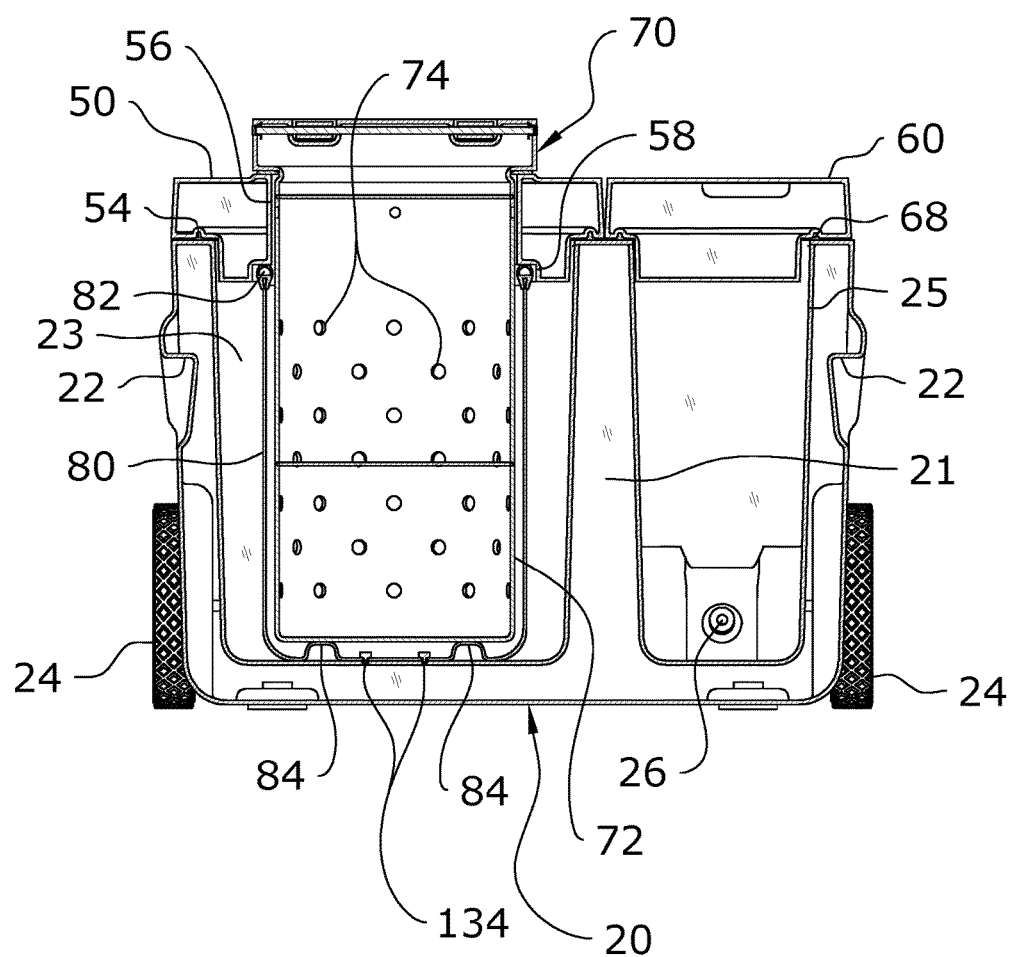
FIG. 13 is a cross sectional view taken along line 13-13 of FIG. 1 of an example embodiment.
Figure 14:
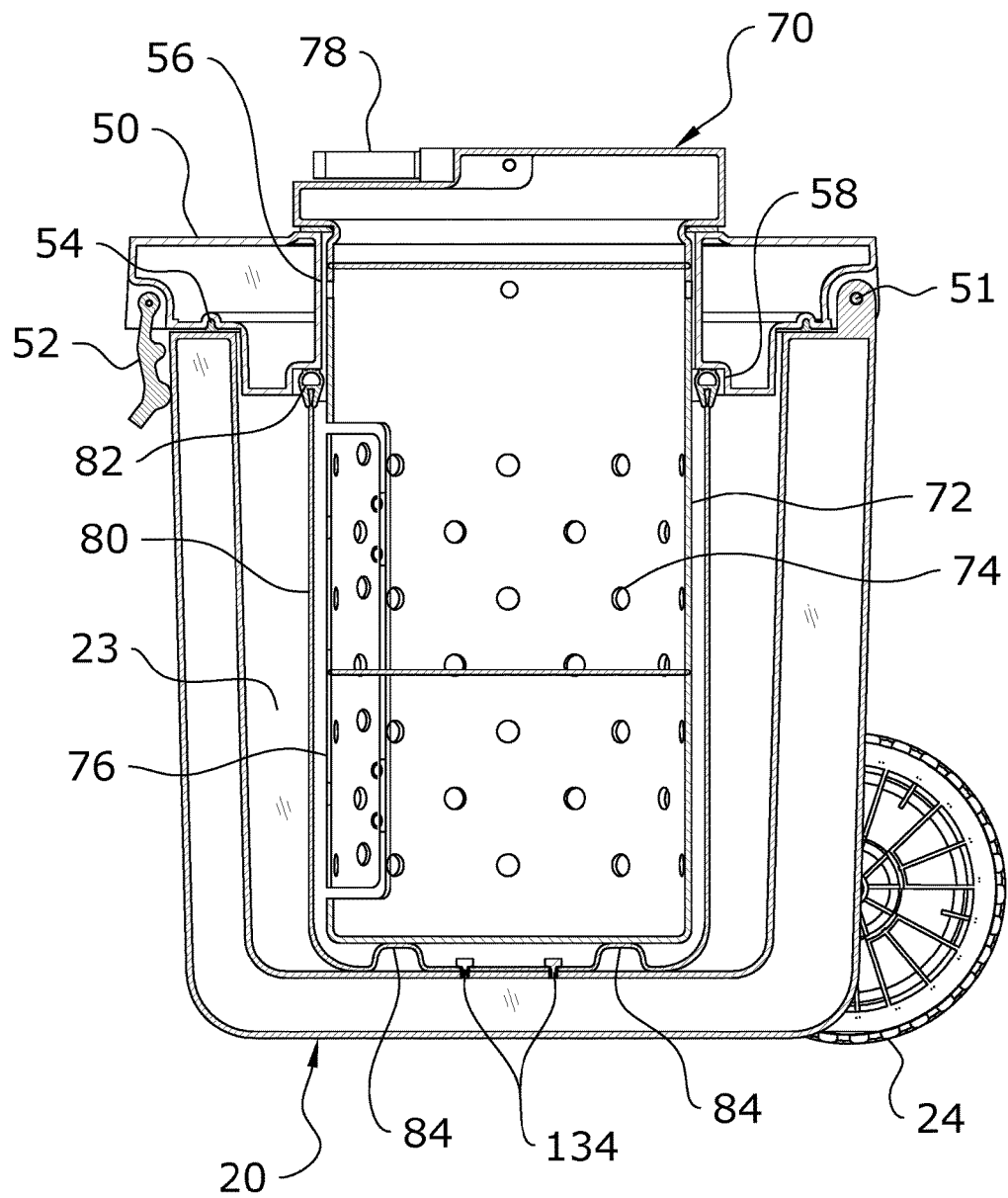
FIG. 14 is a cross sectional view taken along line 14-14 of FIG. 1 of an example embodiment.
Figure 15:
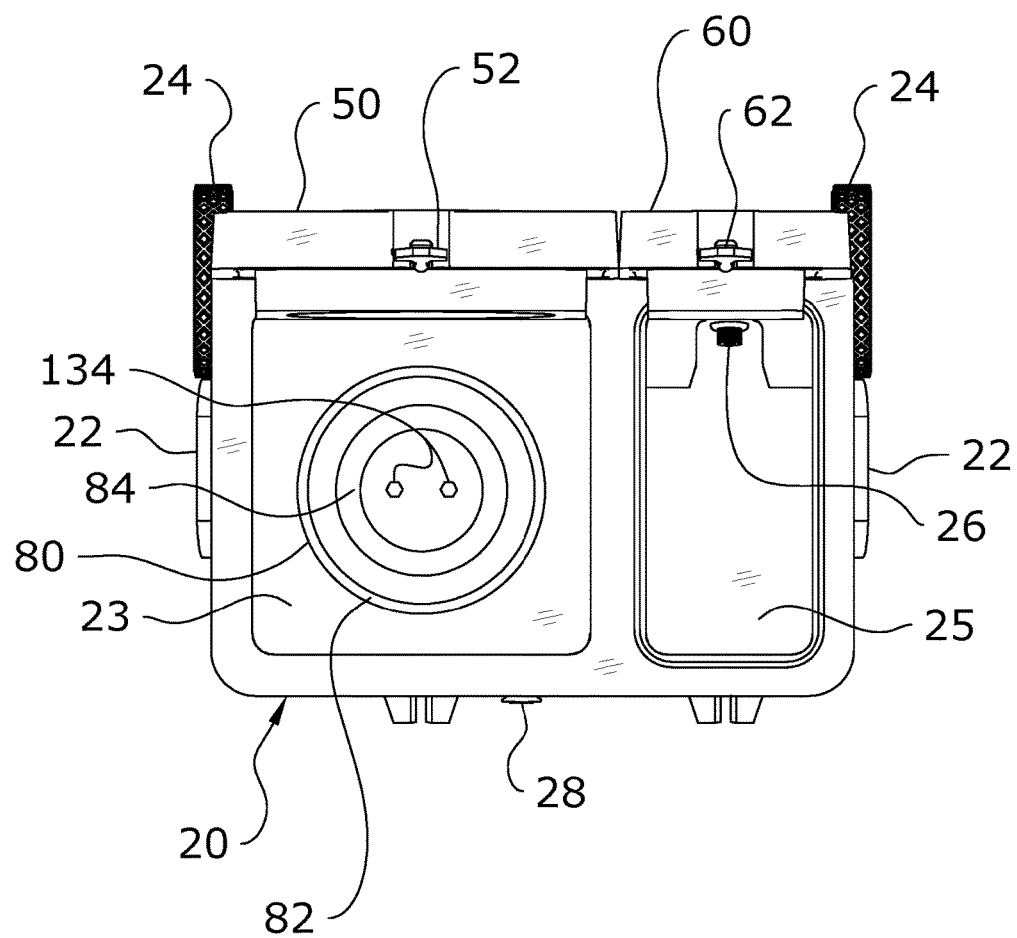
FIG. 15 is a top view of a food and beverage cooler system with the covers opened in accordance with an example embodiment.

One or more divider walls 21 extend upwardly from the floor of the housing 20 between the front wall and the rear wall (or between the left wall and the right wall) to form two or more cavities within the housing 20. FIGS. 12 and 13 illustrate a single divider wall 21 extending upwardly from the floor between the front wall and the rear wall in a sealed manner to prevent liquids from passing between the first cavity 23 and the second cavity 25. The divider wall 21 extends from the front wall to the rear wall within the cavity as shown in FIG. 12. The divider wall 21 further splits the cavity into a first cavity 23 and a second cavity 25. The divider wall 21 further splits the upper opening into a first upper opening and a second upper opening corresponding to the first cavity 23 and second cavity 25 respectively.

Alternatively, the first cavity 23 and the second cavity 25 may be fluidly connected together even with the divider wall 21. The divider wall 21 is preferably insulated so the first cavity 23 and the second cavity 25 may have different thermally managed temperatures, but the divider wall 21 may alternatively not be thermally managed. The divider wall 21 preferably has an upper edge that is at approximately the same height as the upper edges of the front wall, rear wall, left wall and right wall as illustrated in FIG. 12 of the drawings. Even though the figures illustrate two cavities 23, 25 formed by a single divider wall 21 having rectangular shaped cross sectional area, the total number of cavities and divider walls 21 may vary from 1 to 3 or more. In addition, the cavities may have various cross sectional shapes other than rectangular such as, but not limited to, circular, oval, triangular, polygonal and the like.

Figure 5:
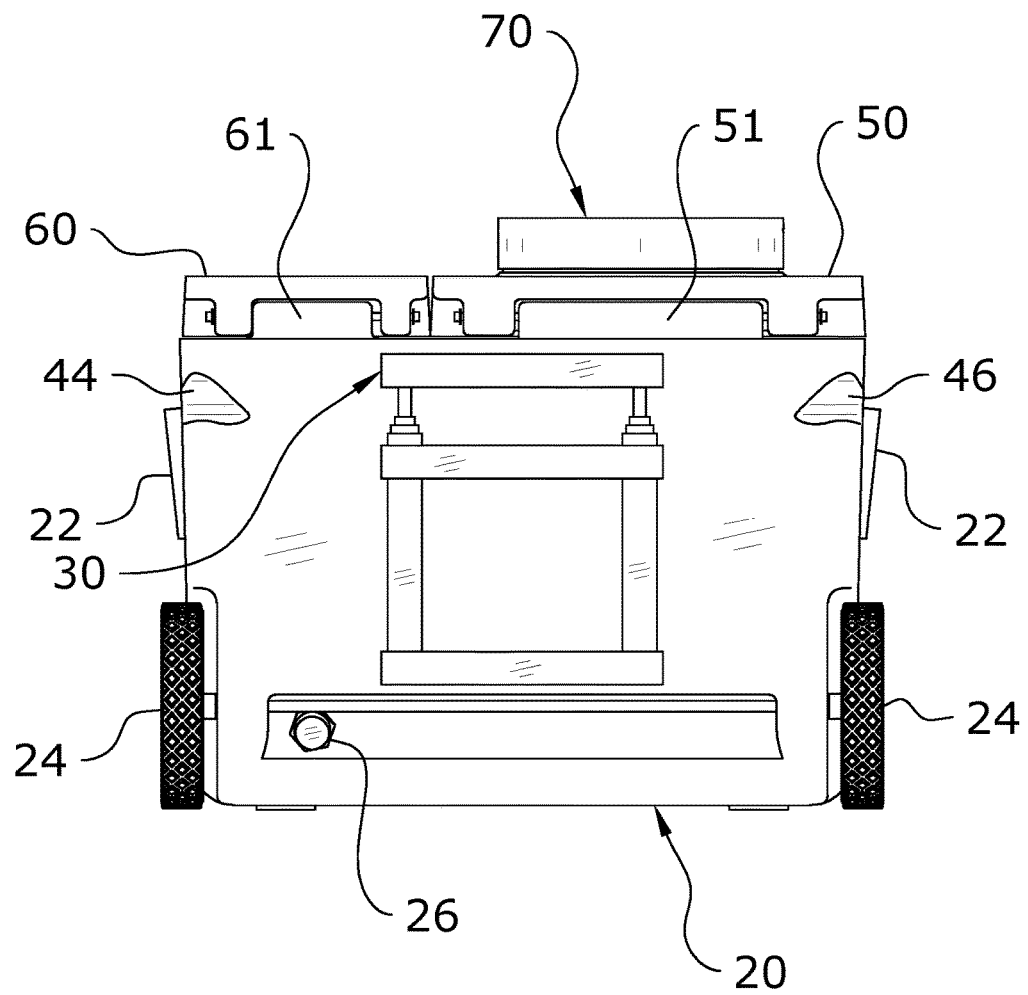
FIG. 5 is a rear perspective view of a food and beverage cooler system in accordance with an example embodiment.

One or more drain spouts 26 may be attached to the housing 20 and fluidly connected to the one or more cavities to allow for draining of liquids in the cavities after usage of the cooler is finished. The drain spout 26 is preferably connected to the rear wall of the housing 20 and is fluidly connected to the second cavity 25 as shown in FIG. 5 of the drawings. However, the drain spout 26 may be connected to various other portions of the housing 20 and may be fluidly connected to the first cavity 23 (or to both the first cavity 23 and the second cavity 25).

The housing 20 further preferably includes one or more wheels 24 for providing efficient transportation of the cooler when loaded with a consumable liquid, beverage containers and/or food products. The wheels 24 are preferably rotatably attached to the lower rear corners of the housing 20 near the right wall, left wall and rear wall as shown in FIGS. 1 and 2 of the drawings.

Figure 2:
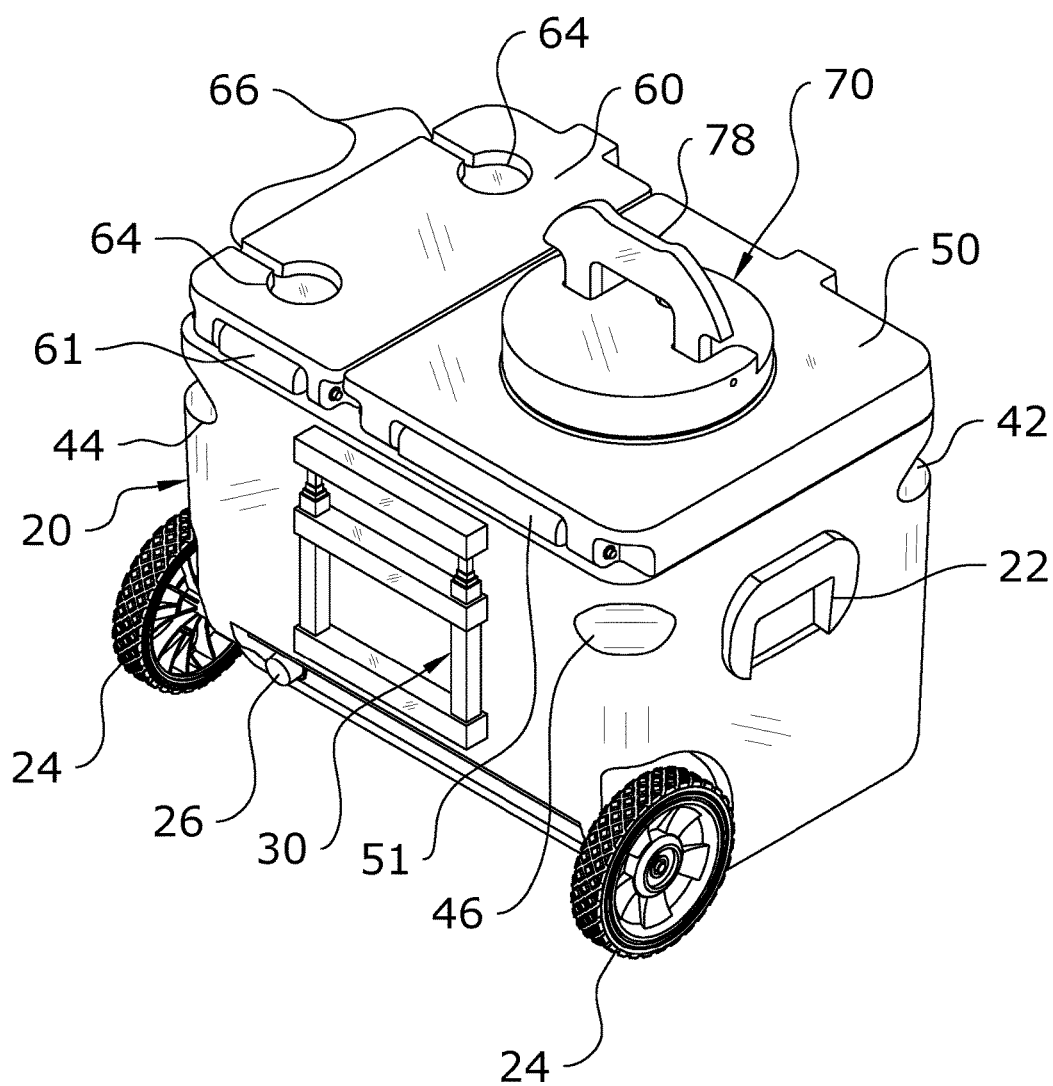
FIG. 2 is a rear perspective view of a food and beverage cooler system in accordance with an example embodiment.

The housing 20 further preferably includes one or more side handles 22 attached to the left wall and the right wall adapted for grasping with the left and right hands of a user to lift and move the housing 20 as illustrated in FIGS. 1 and 2 of the drawings. The side handles 22 may be integrally formed into the housing 20 or may be attached to the housing 20.

D. Cover

One or more covers are adapted to selectively close and open the upper opening of the housing 20. The one or more covers may be connected to the housing 20 in various manners (e.g. pivotally, removably, slidably, etc.). At least a portion of the one or more covers is preferably insulated or constructed of insulating material as is done with conventional coolers. The one or more covers may be constructed of various types of materials including, but not limited to, plastic, metal, composite and the like. The usage of foam insulating material within the one or more covers may also be used to reduce the thermal conduction between the cavity below the one or more covers and the atmosphere surrounding the covers. One or more beverage recesses 64 with corresponding drain channels 66 may be positioned within the upper portion of the cover as illustrated in FIGS. 1 and 2 of the drawings. One or more latches may be used to secure the cover in a closed state.

Figure 7:
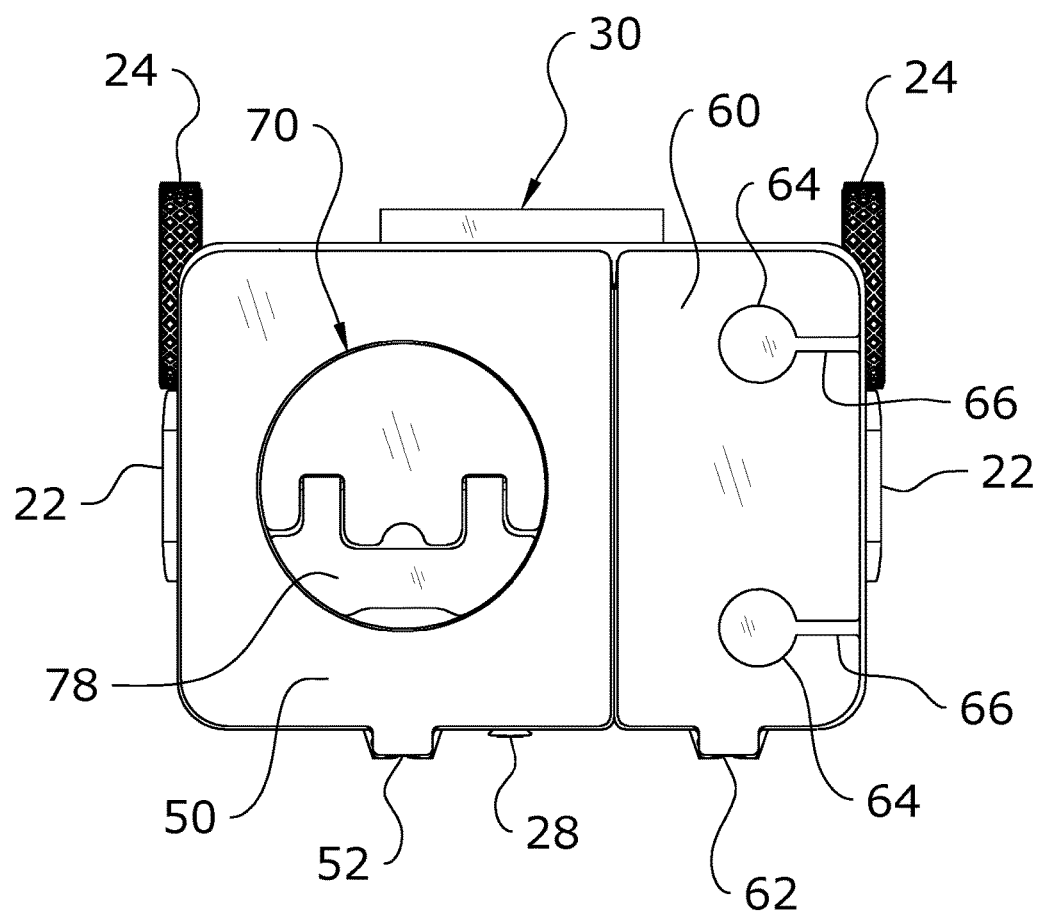
FIG. 7 is a top view of a food and beverage cooler system in accordance with an example embodiment.
Figure 8:
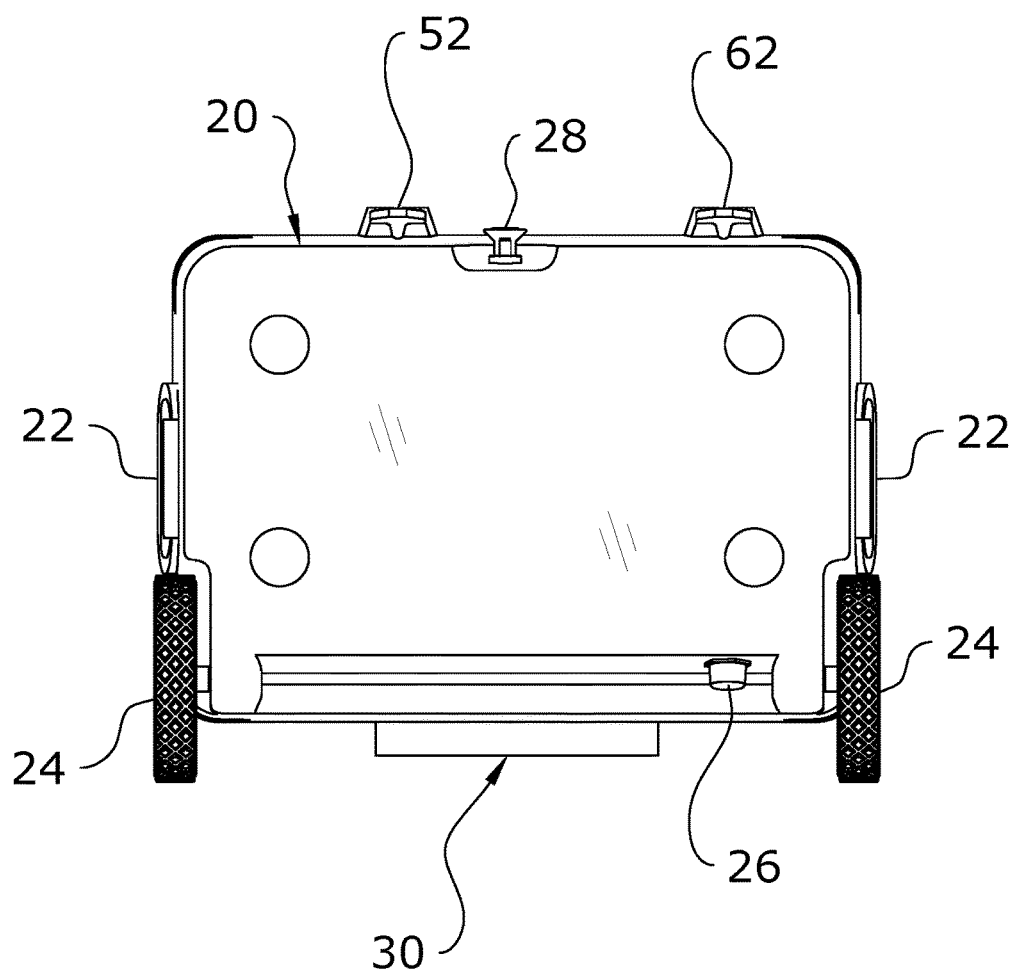
FIG. 8 is a bottom view of a food and beverage cooler system in accordance with an example embodiment.

As illustrated in some of the embodiments, the cover is comprised of a first cover 50 and a second cover 60 that move independently from one another. The first cover 50 selectively closes and opens the first upper opening and preferably has a size/shape corresponding to the first upper opening. The second cover 60 selectively closes and opens the second upper opening and preferably has a size/shape corresponding to the second upper opening. The first cover 50 and the second cover 60 are each preferably pivotally attached to the rear wall of the housing 20 with a first hinge 51 and second hinge 61 respectively as shown in FIGS. 5, 7 and 12 of the drawings. A first latch 52 is preferably connected between the first cover 50 and the front wall of the cooler to selectively lock the first cover 50 into the closed position upon the first cavity 23. A second latch 62 is preferably connected between the second cover 60 and the front wall of the cooler to selectively lock the second cover 60 into the closed position upon the second cavity 25. If a unitary cover 100 is used as shown in FIGS. 3 and 16 through 21, the unitary cover 100 is preferably pivotally attached to the rear wall of the housing 20 by one or more hinges but may be connected to the housing 20 via other means as discussed with respect to the first cover 50 and the second cover 60.

The first cover 50 preferably includes a first seal 54 surrounding the interior perimeter thereof to seal with the upper edge of the housing 20 including the divider wall 21. The second cover 60 preferably includes a second seal 68 surrounding the interior perimeter thereof to seal with the upper edge of the housing 20 including the divider wall 21. If a unitary cover 100 is used, a seal is preferably used to seal the unitary cover 100 to the upper edge of the housing 20 to prevent contamination of the food contents similar to the seals used for the first cover 50 and second cover 60.

E. Removable Food Container

Figure 11:
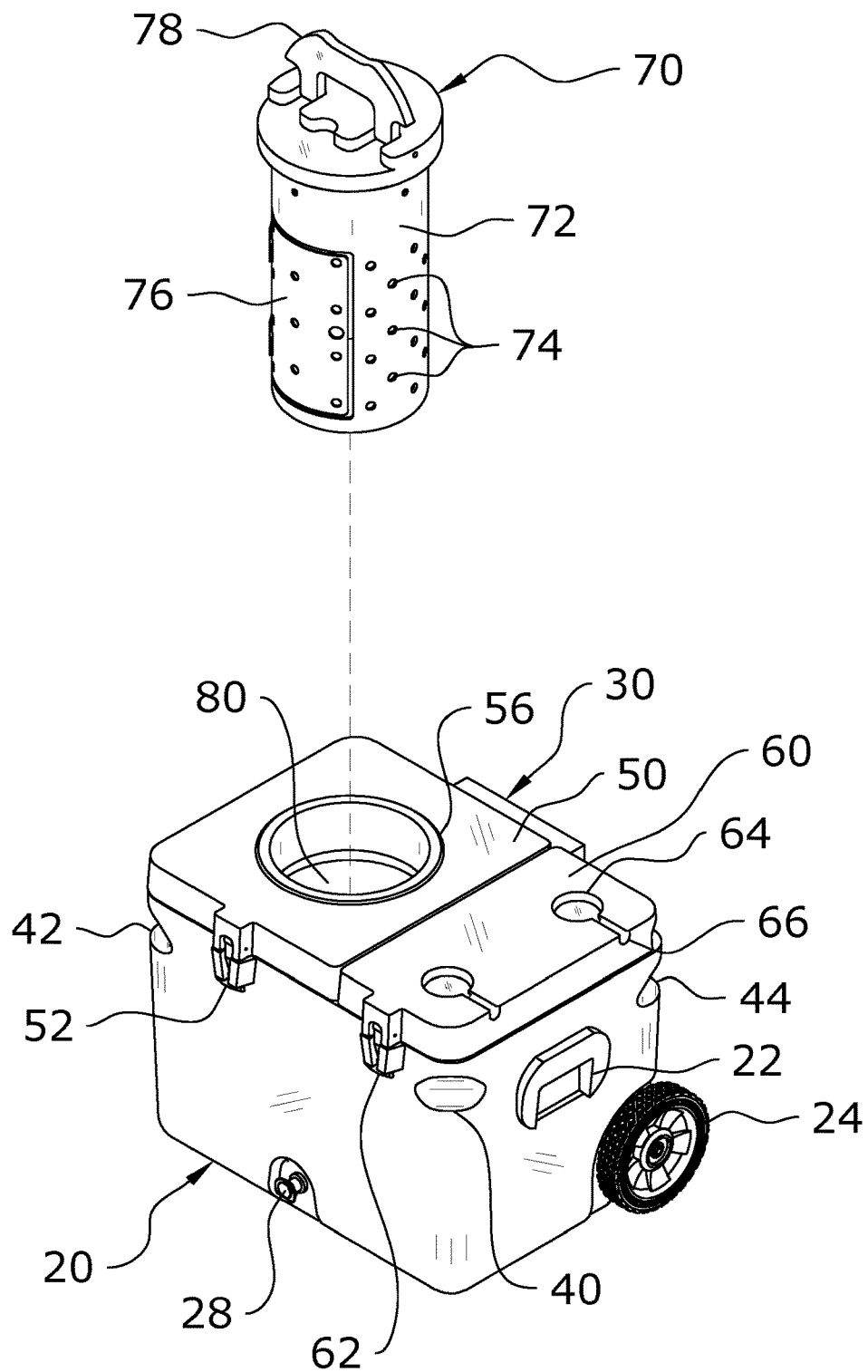
FIG. 11 is an exploded front perspective view of a food and beverage cooler system in accordance with an example embodiment.

In one embodiment, a first access opening 56 extends through the first cover 50 as shown in FIG. 11 of the drawings. The first access opening 56 is formed to the shape and size of the food container 70 that removably extends through the first access opening 56 into the first cavity 23 of the housing 20. The food container 70 is formed from one or more sidewalls 72 to form a container that stores a volume of food items. The sidewall 72 of the food container 70 preferably includes a plurality of apertures 74 to facilitate thermal conduction between the separating unit 80 and the food items in the food container 70. The food container 70 is designed to keep the food items relatively dry and away from the ice and liquids within the portion of the first cavity 23 surrounding the separating unit 80. The food container 70 preferably is comprised of a tubular structure with a circular cross sectional shape, a door 76 removably connected to the sidewall 72 and an upper handle 78 attached to a ceiling of the food container 70. One or more shelves within the food container 70 provide different compartments for storing various food items to be cooled within the separating unit 80. The separating unit 80 is a sealed tubular structure with a sealed floor that prevents the liquids from within the first cavity 23 from entering the interior of the separating unit 80 thereby maintaining the food items cool and dry. The food container 70 may be removed through the first access opening 56 by the user grasping the upper handle 78 and pulling the food container 70 out of the first cavity 23 through the first access opening 56 as illustrated in FIG. 11 of the drawings. U.S. Pat. No. 8,393,493 to Christensen for a Drink Cooler with Cold Storage provides an exemplary food container 70 and separating unit 80 suitable for use within the present invention and is hereby incorporated by reference herein.

In an embodiment, the first cavity 23 of the housing 20 is preferably adapted for storing both a consumable liquid (e.g. drinking water, sports drink) and a food container 70 that stores a number of food items (e.g. sandwiches, snack bars, chips). In this embodiment, the second cavity 25 is preferably used for storing beverage containers (e.g. beverage cans, beverage bottles, food products to be cooled and the like). In this embodiment, the first cavity 23 is sealed from the second cavity 25 to prevent the transfer of liquids between the first cavity 23 and the second cavity 25. A separating unit 80 is attached inside of the first cavity 23 that forms a receiver cavity that receives the food container 70 as shown in FIGS. 11 through 14. The separating unit 80 may have one or more raised portions 84 to support the food container 70 above the floor of the interior of the separating unit 80 in case any liquid or condensation exists in the bottom of the separating unit 80. The separating unit 80 may have various structures and configurations. The separating unit 80 is illustrated as a cylindrical structure having a floor and a single wall having a circular cross sectional shape, however, various other structures and configurations may be used to form the separating unit 80 (e.g. a rectangular, oval or triangular shaped cross sectional structure). The separating unit 80 preferably has a cross sectional shape similar to the cross sectional shape of the food container 70.

The separating unit 80 forms an interior sealed cavity that is substantially sealed from the portion of the first cavity 23 that is on the exterior of the separating unit 80 which allows for a consumable liquid (e.g. drinking water, flavored sports drink, etc.) to fill the first cavity 23 outside of the separating unit 80 that can be dispensed via the spigot 28 for human consumption. The spigot 28 may be comprised of any type of nozzle with a valve or other flow control to control the flow of liquid from the first cavity 23 to the outside of the housing 20. The separating unit 80 may be integrally formed with the floor of the housing 20, adhered or welded to the floor of the housing 20, or attached with fasteners to the floor in a sealed manner to prevent leakage of liquid into the interior of the separating unit 80. The separating unit 80 may be non-removably attached to the housing 20 or removably attached to the housing 20 to allow for usage of the first cavity 23 without the food container 70 (e.g. for storage of beverage containers or to increase the volume of consumable liquid stored within the first cavity 23).

The upper end of the separating unit 80 preferably includes an upper seal 82 (e.g. rubber or foam seal) that seals against a recessed interior lip 58 surrounding the lower portion of the first access opening 56 within the first cover 50 when the first cover 50 is in the closed state as shown in FIGS. 12 through 15 of the drawings. The upper seal 82 prevents the liquid within the first cavity 23 surrounding the separating unit 80 from escaping the cooler and also prevents contamination of the liquid in the first cavity 23.

F. Telescoping Handle

Figure 9:
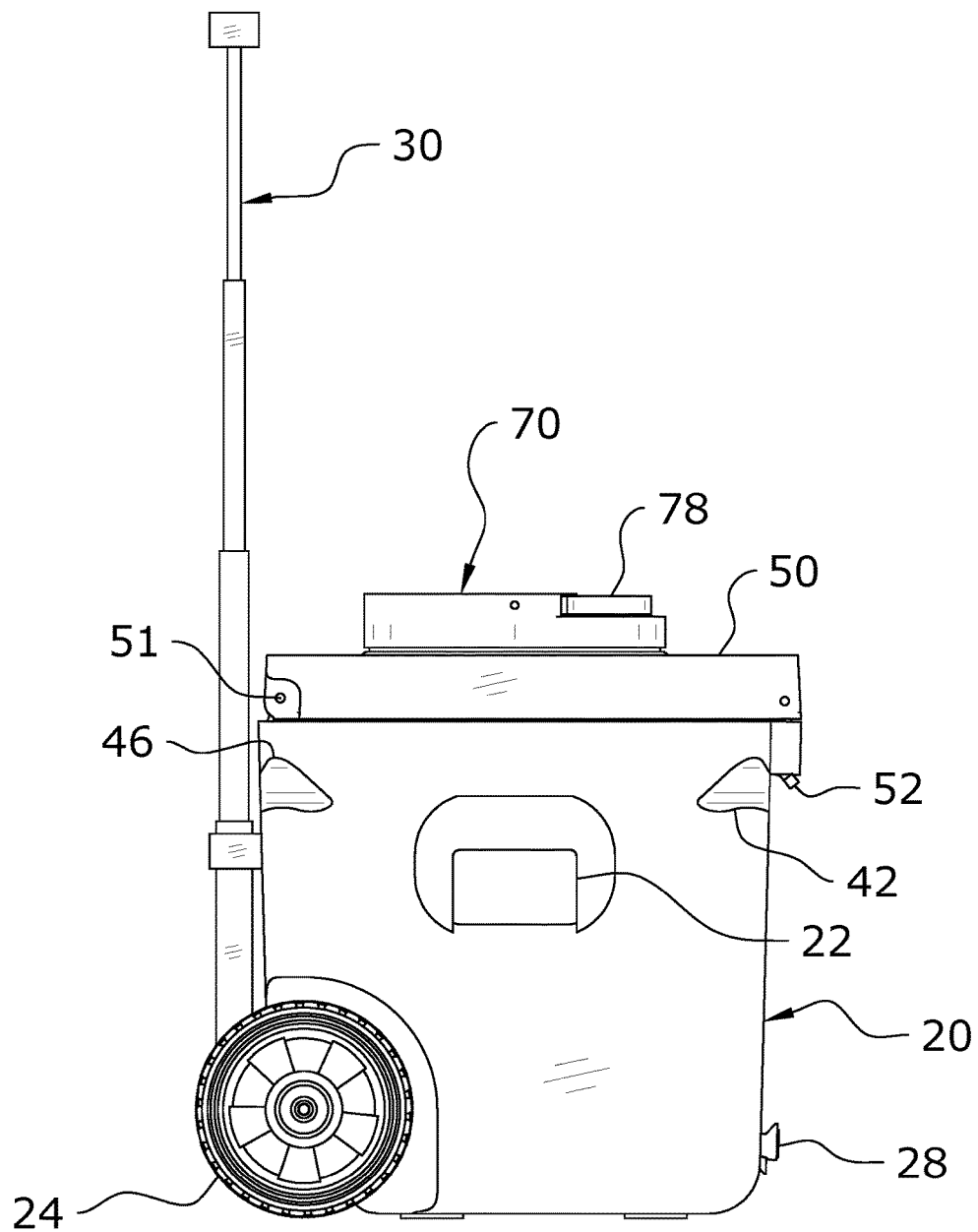
FIG. 9 is a right side view of a food and beverage cooler system in accordance with an example embodiment.
Figure 10:
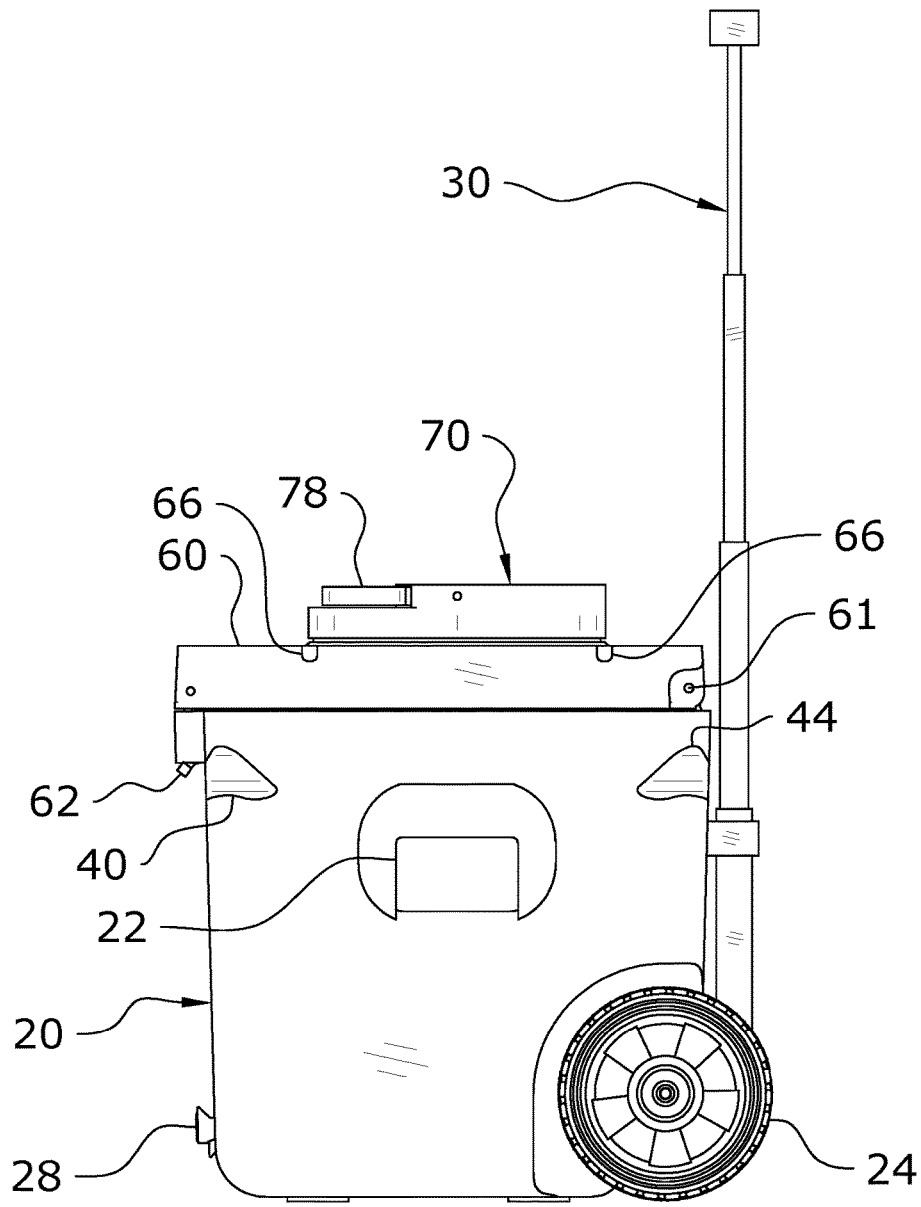
FIG. 10 is a left side view of a food and beverage cooler system in accordance with an example embodiment.

FIGS. 5, 9 and 10 best illustrate an embodiment comprised of a handle attached to the rear wall of the housing 20 to provide for transportation of the cooler. The handle is preferably a telescoping handle 30 as further illustrated in FIGS. 5, 9 and 10 of the drawings. The telescoping handle 30 has a retracted state as shown in FIG. 5 and an extended state as shown in FIGS. 9 and 10. The handle may be comprised of various other structures and configurations including non-telescoping handles.

G. Tie Down Notches

In another embodiment, the housing 20 preferably includes a first corner portion between the front wall and the left wall, a second corner portion between the front wall and the right wall, a third corner portion between the rear wall and the left wall, and a fourth corner portion between the rear wall and the right wall. In this embodiment, one or more notches extend into one or more corresponding corner portions. It is preferable to have two or more notches extending into corresponding corner portions that are opposite of one another to allow for tying down of the housing 20 to an object 10 such as an all-terrain vehicle (ATV).

In one preferred embodiment illustrated in FIGS. 1 through 6 of the drawings, a first notch 40 extends into the first corner portion, a second notch 42 extending into the second corner portion, a third notch 44 extends into the third corner portion, and a fourth notch 46 extends into the fourth corner portion. In another preferred embodiment, the first notch 40 preferably extends into both the front wall and the left wall, the second notch 42 preferably extends into both the front wall and the right wall, the third notch 44 preferably extends into both the rear wall and the left wall, and the fourth notch 46 preferably extends into both the rear wall and the right wall as further shown in FIGS. 1 through 6 of the drawings.

Figure 3:
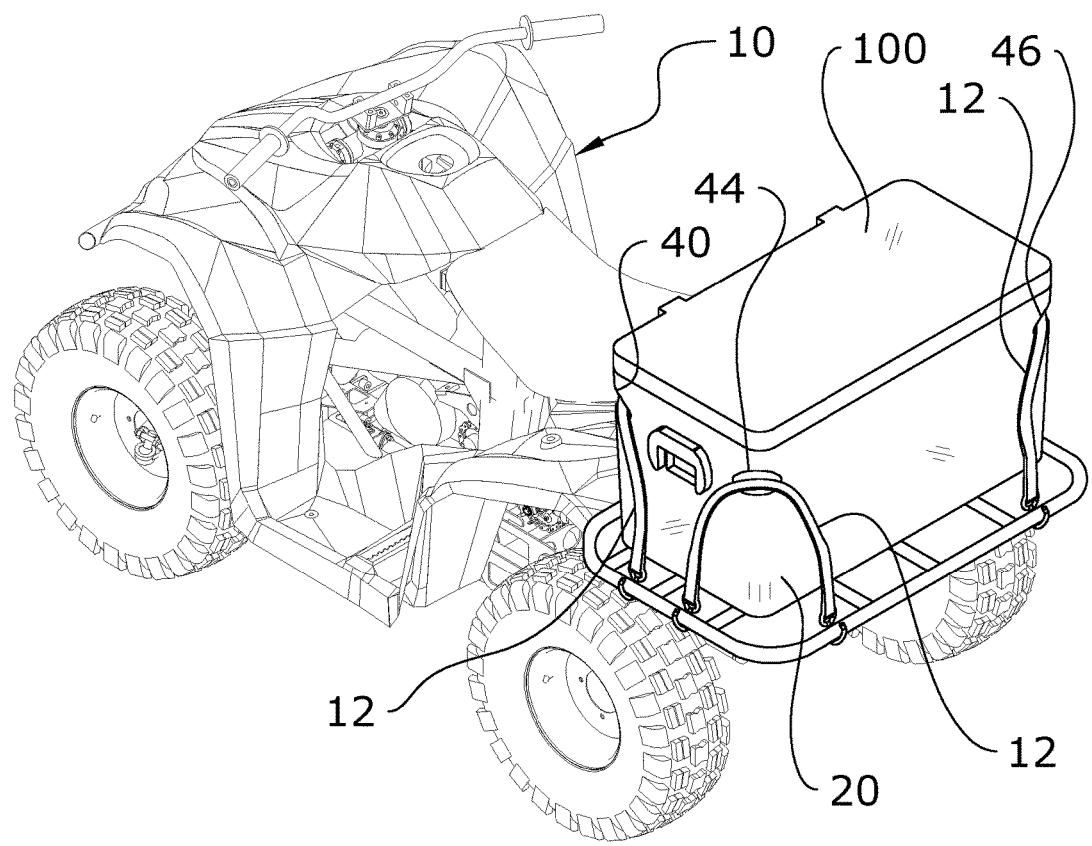
FIG. 3 is a front perspective view of a food and beverage cooler system attached to a rack of an all-terrain vehicle (ATV) in accordance with an example embodiment.
Figure 4:
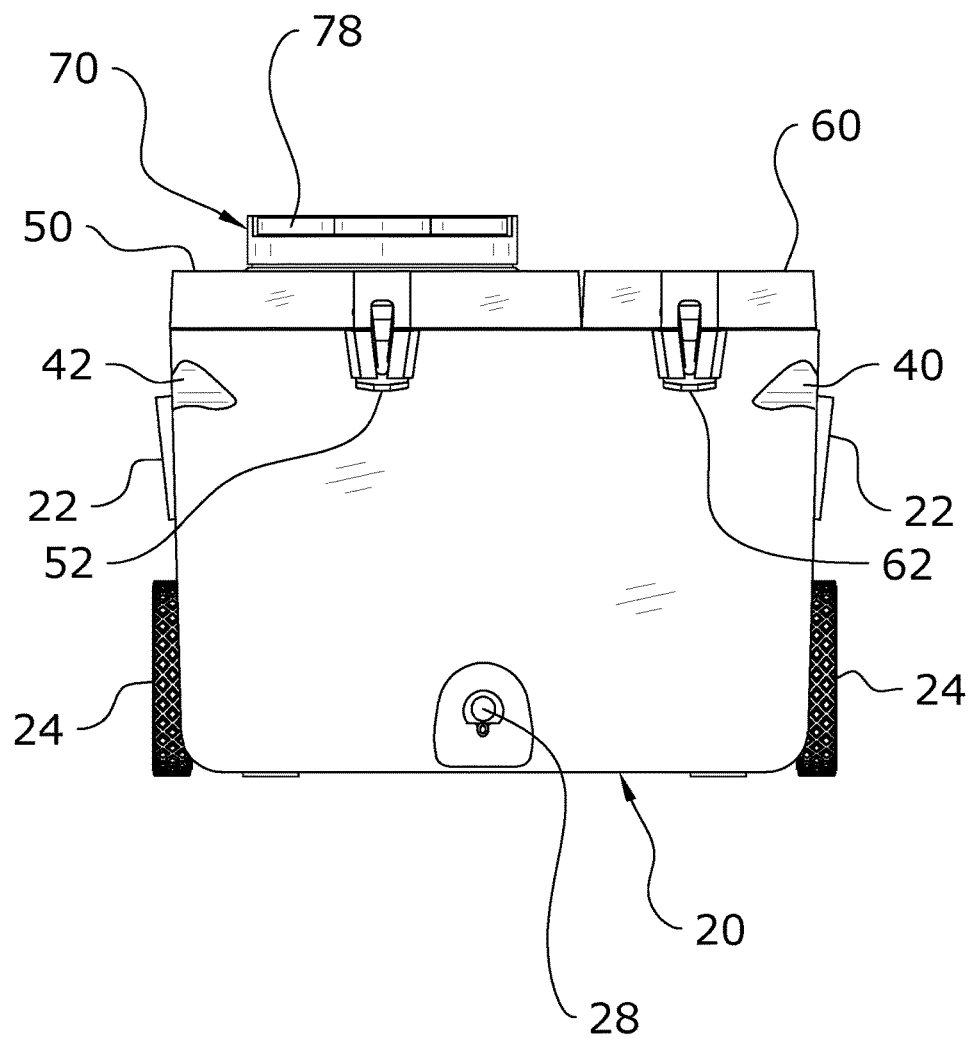
FIG. 4 is a front view of a food and beverage cooler system in accordance with an example embodiment.

The notches are each adapted to receive a portion of an elongated fastener 12 (e.g. tie down strap, bungee cord, rope, string, rubber strap, chain, etc.) to secure the housing 20 to the object 10. FIG. 3 illustrates using four separate elongated fasteners 12 (with the back corner elongated fastener 12 not viewable) with one of the elongated fasteners 12 in each of the corresponding notches 40, 42, 44, 46. It can be appreciated that a single elongated fastener 12 may be used and extend through two or more of the notches 40, 42, 44, 46 to secure the cooler to an object 10. The distal ends of the elongated fasteners 12 may be connected to the object 10 in various manners such as with hooks attached to the distal end or by tying the distal ends to the object 10. FIG. 3 illustrates the usage of hooks connected to the elongated fasteners 12 being attached to the perimeter portion of the rear rack of the ATV, but it can be appreciated that various other systems of connections may be utilized. The elongated fasteners 12 are preferably relatively taut to prevent movement of the housing 20 with respect to the ATV as the ATV (or other object 10) moves over rough terrain. The notches 40, 42, 44, 46 may be utilized to secure the cooler to various other objects 10 such as, but not limited to, a bed of a pickup box, a trailer, a front rack of an ATV, a watercraft and the like.

The notches 40, 42, 44, 46 are preferably integrally formed within the housing 20. However, it can be appreciated that the notches 40, 42, 44, 46 may be formed by corresponding structures (e.g. brackets) extending outwardly from the housing 20 or otherwise attached to the housing 20. For example, the notches 40, 42, 44, 46 could each be formed by a hook member attached to the housing 20. Various other configurations and structures may be utilized to form the notches 40, 42, 44, 46 within the housing 20 of the cooler.

The notches 40, 42, 44, 46 each are preferably positioned within an upper portion of the housing 20 as shown in FIGS. 1 through 6 but may also be positioned in a central or lower portion of the housing 20. The notches 40, 42, 44, 46 are preferably positioned at the same height on the housing 20 as shown in FIGS. 1 through 6 but may have different heights. The outer portion of the notches are preferably narrower in width and greater in height than the inner portion of the notches as illustrated in FIGS. 1, 2, 5 and 6 of the drawings.

Figure 6:
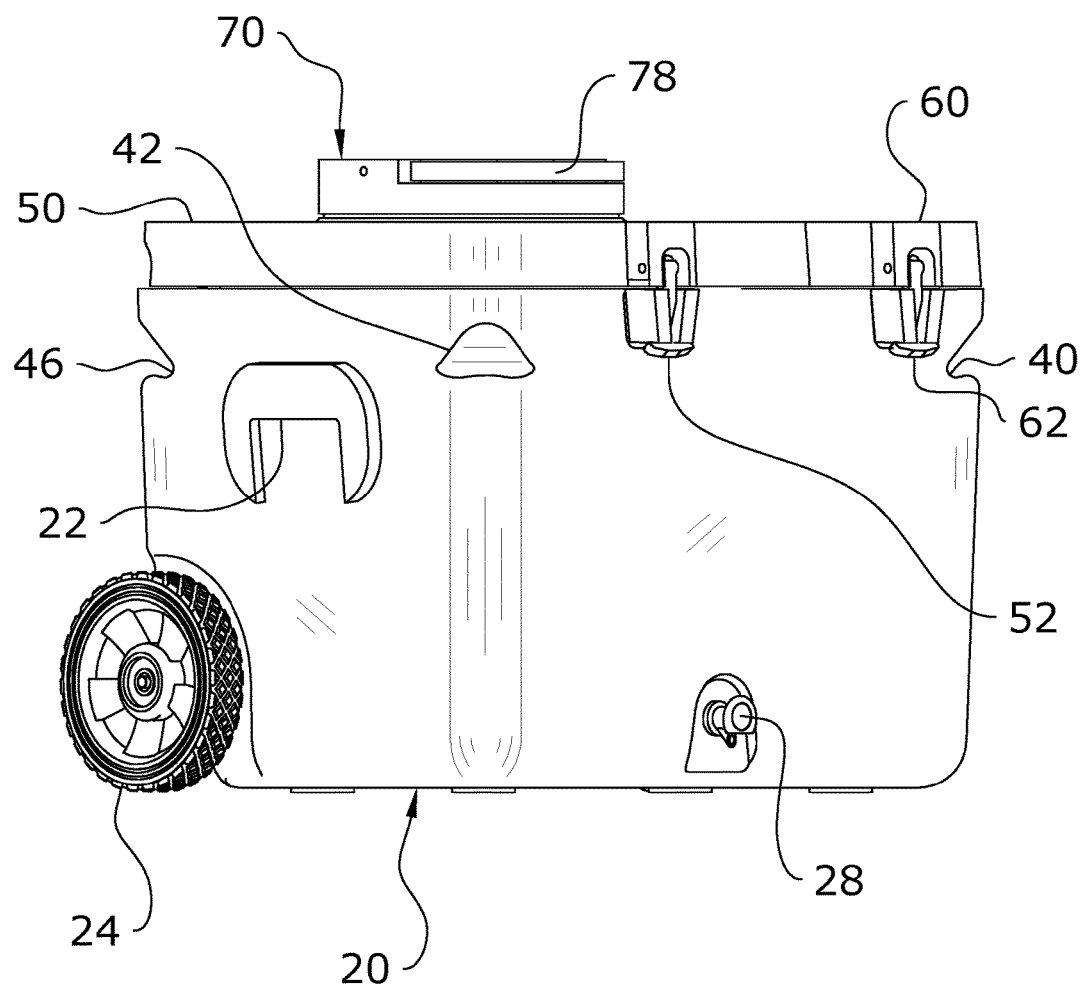
FIG. 6 is an angled side view of a food and beverage cooler system in accordance with an example embodiment.

In one example embodiment, the notches 40, 42, 44, 46 each extend inwardly into the housing 20 in a substantially horizontal manner. The notches 40, 42, 44, 46 each preferably have an inner portion, a lower portion and an upper portion wherein the inner portion is preferably rounded (not required) and the lower portion extends inwardly and downwardly to the inner portion as best illustrated in FIG. 6. The notches 40, 42, 44, 46 are each preferably tapered extending from the outside to the inside of the notch 40, 42, 44, 46. In an embodiment, the notches 40, 42, 44, 46 each preferably have a substantially U-shaped structure. In another embodiment, the lower portion and the upper portion both extend inwardly and downwardly to the inner portion. The notches 40, 42, 44, 46 are preferably tapered in one example embodiment to help guide the elongated fastener 12 into the notches 40, 42, 44, 46. In another embodiment, the lower portion and the upper portion of each of the notches 40, 42, 44, 46 taper inwardly as illustrated in FIG. 6 of the drawings. In another embodiment, the notches 40, 42, 44, 46 form a lower lip that catchably receives a portion of an elongated fastener 12. The notches 40, 42, 44, 46 preferably have the same shape and structure, however, different shapes and/or structures may be utilized for each or some of the notches 40, 42, 44, 46.

Figure 16:
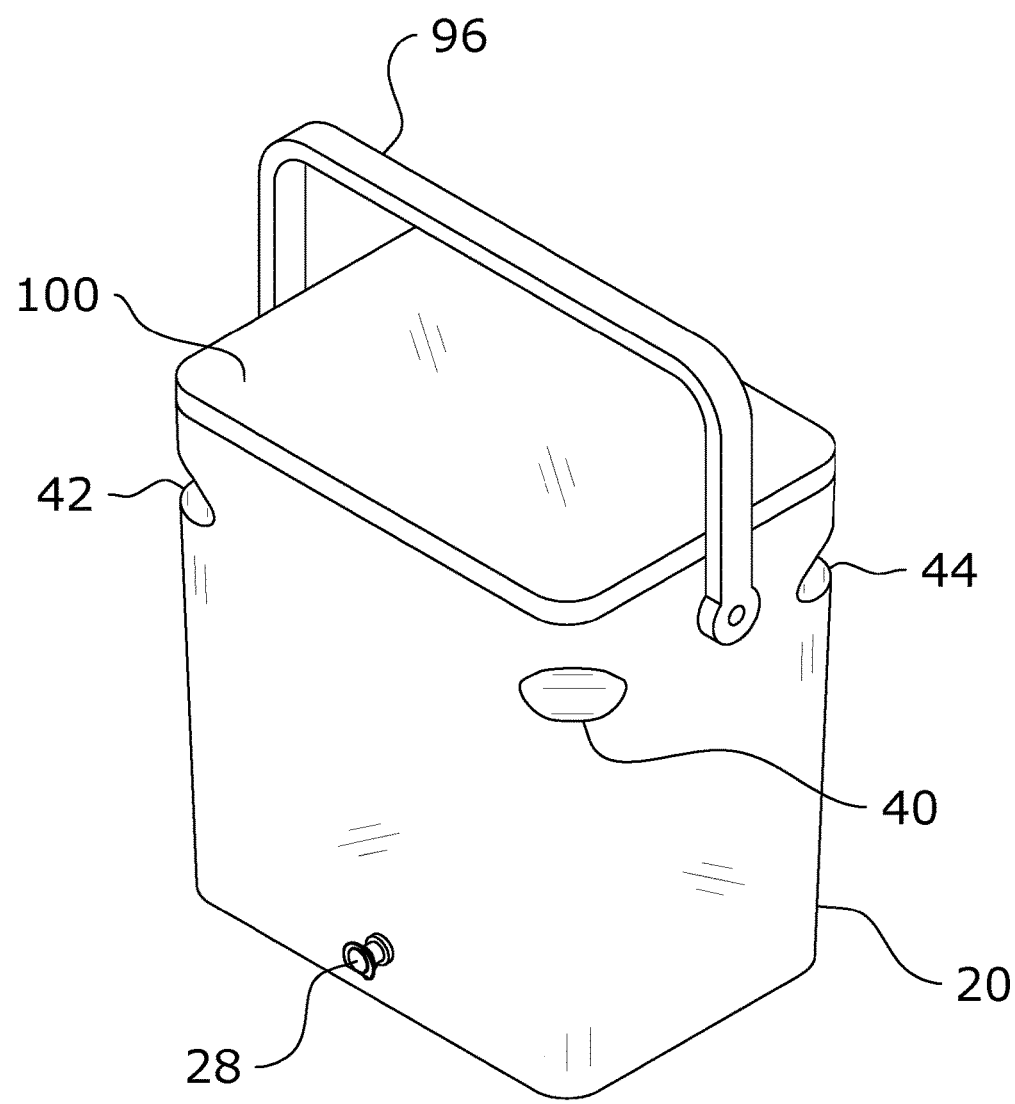
FIG. 16 is a front perspective view of a food and beverage cooler system in accordance with an example embodiment.
Figure 17:
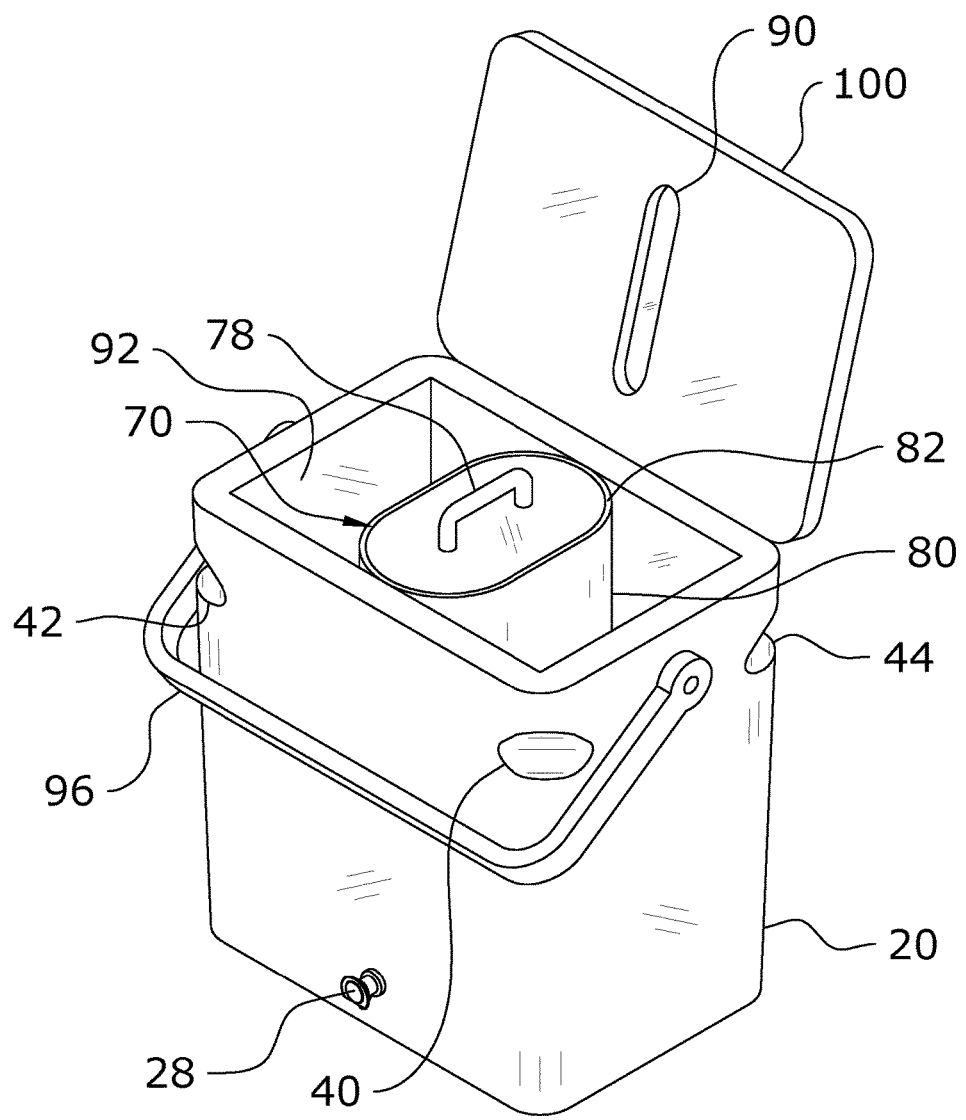
FIG. 17 is a front perspective view of a food and beverage cooler system with the cover opened in accordance with an example embodiment.
Figure 18:
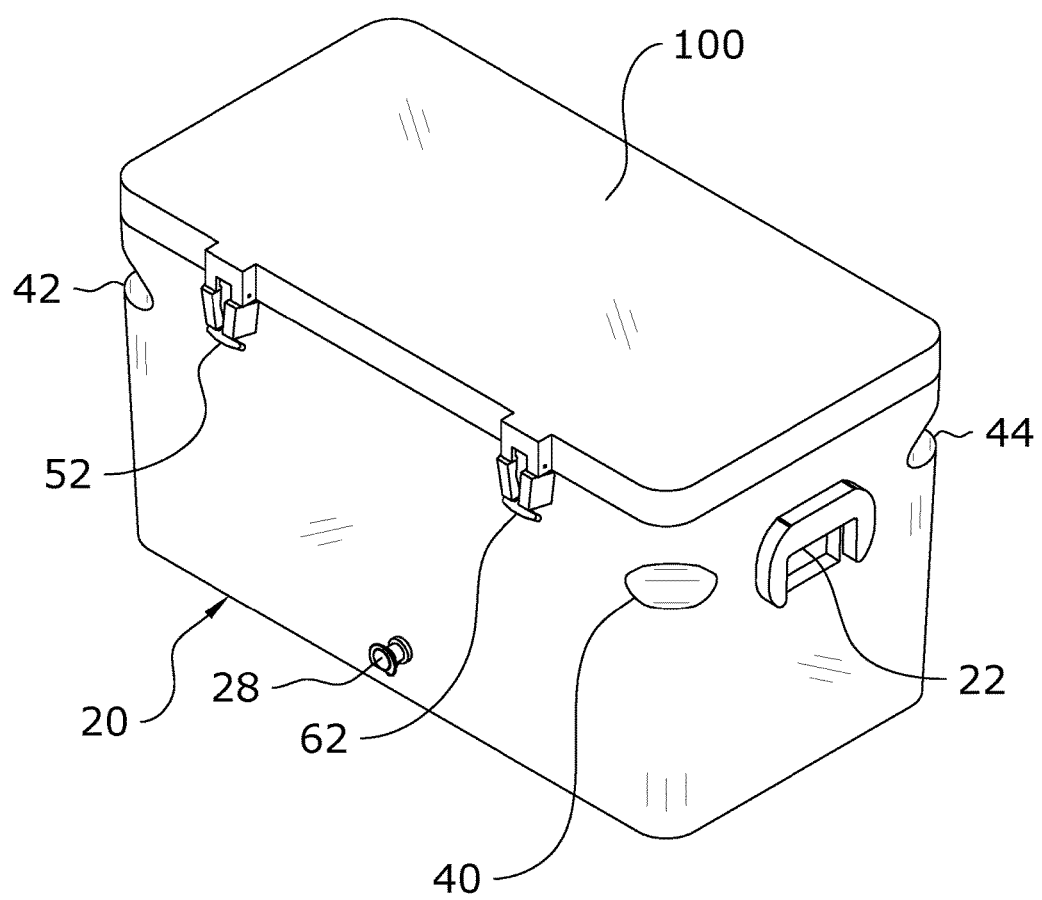
FIG. 18 is a front perspective view of a food and beverage cooler system in accordance with an example embodiment.
Figure 19:
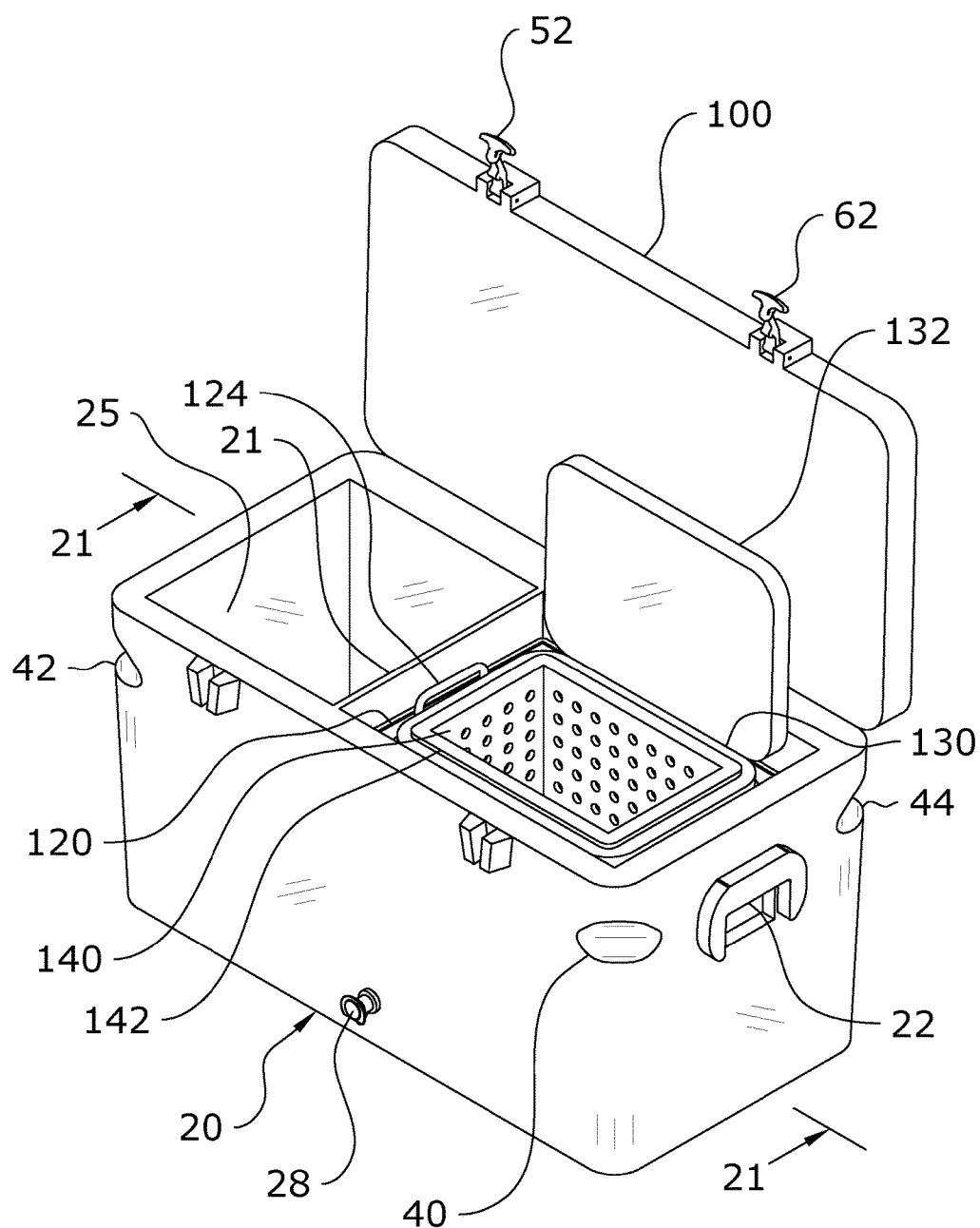
FIG. 19 is a front perspective view of a food and beverage cooler system with the cover opened in accordance with an example embodiment.

While FIGS. 1 through 15 illustrate the food container 70 being utilized with a cooler having at least two cavities 23, 25, FIGS. 16 and 17 illustrate another embodiment where the cooler has a single interior cavity 92 without having a second cavity 25. FIG. 17 further illustrates the separating unit 80 and the food container 70 having an oval shaped cross sectional shape to provide additional room on the left and right sides within the single interior cavity 92 for ice used to cool the consumable liquid surrounding the divider wall 21 while maintaining a relatively compact overall cooler structure. FIGS. 16 and 17 further illustrate the usage of a pivoting handle 96 attached to the housing 20. FIG. 17 further illustrates the unitary cover 100 including a handle recess 90 that receives a portion of the upper handle 78 of the food container 70. The housing 20 in the embodiment illustrated in FIGS. 16 and 17 preferably includes the tie down notches 40, 42, 44, 46 also to secure the cooler to an object 10 such as an ATV.

H. Interior Cooler Embodiment

FIGS. 18 through 21 illustrate another embodiment that has a first cavity 23 and a second cavity 25 within the housing 20. The first cavity 23 is adapted to removably receive a secondary cooler 130 that has a body portion 131 and a cover 132. The secondary cooler 130 further includes a basket 140 having an upper lip 142 that is removably positioned on the interior of the secondary cooler 130. The basket 140 is formed to be removable from the secondary cooler 130 thereby allowing the user to selectively remove food products from the secondary cooler 130 without having to remove the entire secondary cooler 130 from the main cooler 20. The basket 140 preferably includes a plurality of apertures to facility cooling of the food items inside of the interior of the basket but the basket may also be constructed of a structure that doesn't have apertures. The basket 140 may also include one or more fasteners to removably attach the basket 140 to the floor of the secondary cooler 130 to prevent floating when liquids are at the bottom of the secondary cooler 130. Examples of suitable fasteners include, but are not limited to, suction cups that would face downwardly and engage the bottom interior surface of the secondary cooler 130 with a suction force to prevent movement of the basket 140.

Figure 20:
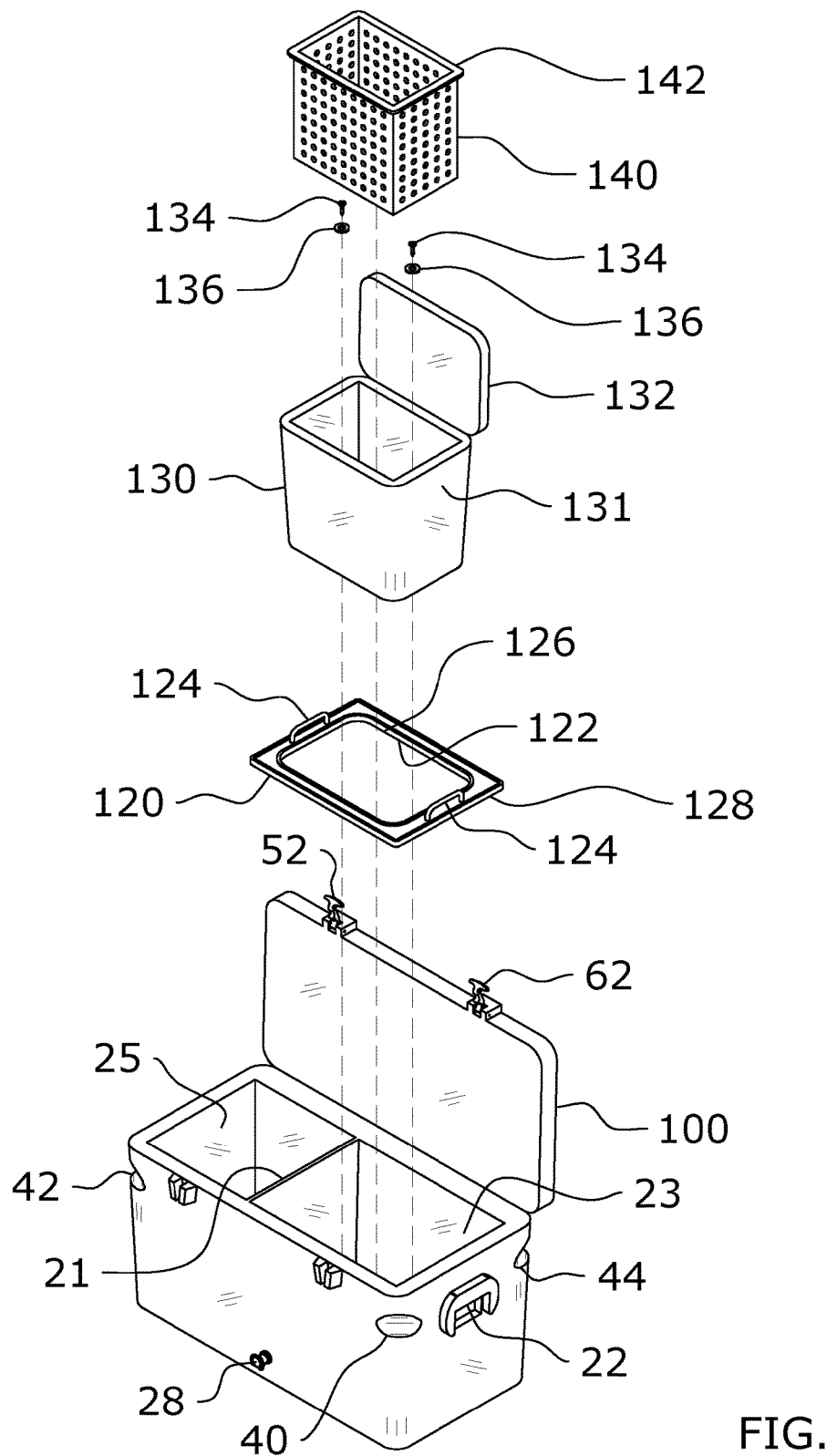
FIG. 20 is an exploded front perspective view of a food and beverage cooler system in accordance with an example embodiment.
Figure 21:
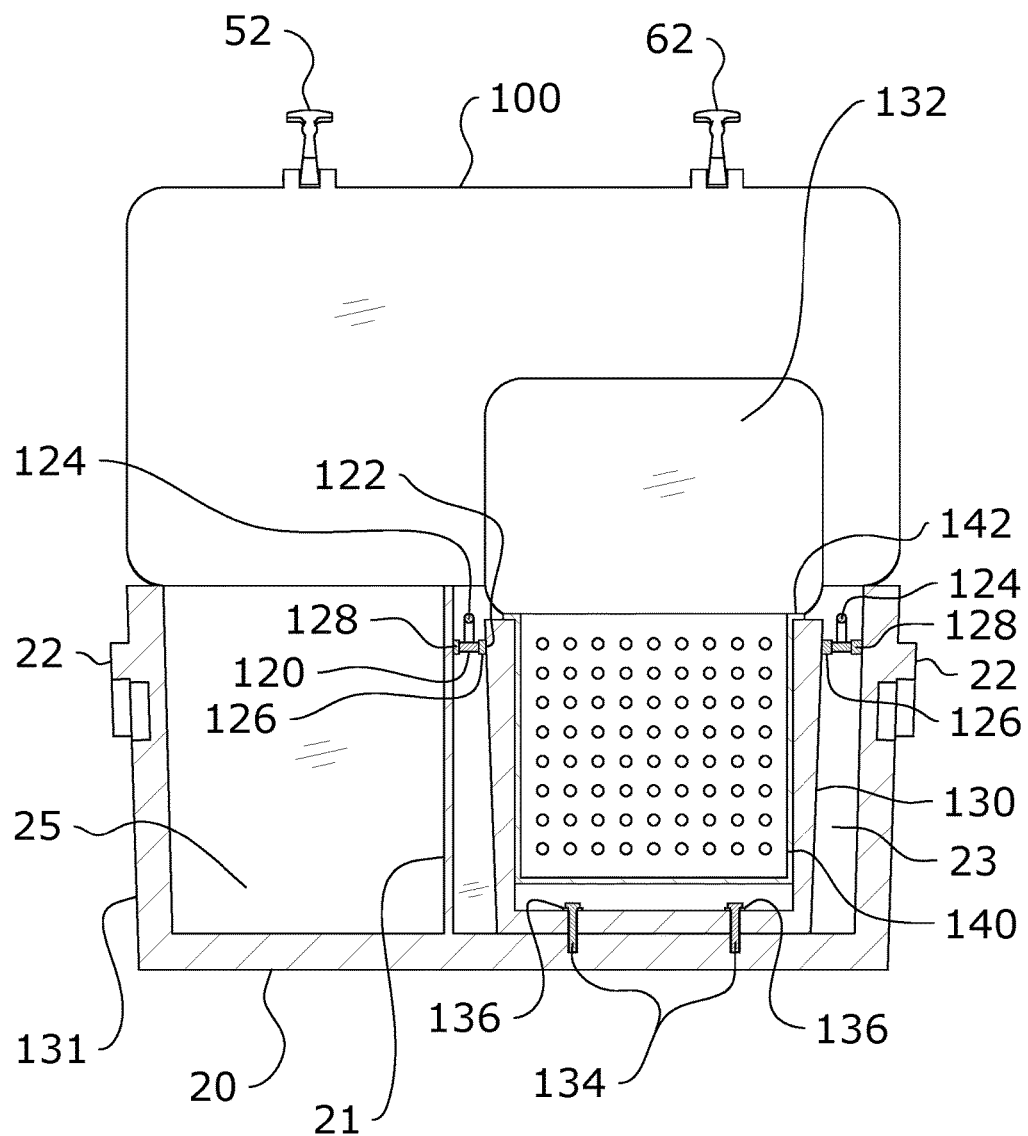
FIG. 21 is a cross sectional view taken along line 21-21 of FIG. 19.

The secondary cooler 130 is sized to fit within the first cavity 23 with the unitary cover 100 closed and the cover 132 of the secondary cooler 130 closed. Alternatively, a first cover 50 and a second cover 60 may be used with this embodiment similar to the covers 50, 60 shown in FIGS. 1 and 2 of the drawings. A support panel 120 is preferably provided that includes an opening 122, an inner seal 126 on the interior perimeter of the opening 122 to seal with the exterior surface of the secondary cooler 130 and an outer seal 128 to seal with the interior wall of the first cavity 23 of the main cooler as shown in FIGS. 20 and 21 of the drawings. The support panel 120 further includes one or more handles 124. The support panel 120 further prevents side-to-side movement of the secondary cooler 130 within the first cavity 23.

The secondary cooler 130 may also be secured in a non-movable manner via threaded fasteners 134 (e.g. screws, bolts) that threadably engage threaded openings within the floor of the housing 20 as shown in FIG. 21. The threaded fasteners 134 each preferably include a seal washer 136 (e.g. rubber washer, plastic washer) to help seal the interior of the secondary cooler 130 with respect to the surrounding portion of the first cavity 23 thereby allowing a consumable liquid to be positioned within the first cavity 23 surrounding the secondary cooler 130. If the user desires to remove the interior cooler, the user removes the threaded fasteners 134 and then removes the secondary cooler 130 for use as a cooler completely separate from the main housing 20.

I. Operation of Preferred Embodiment

In use, the user fills the area of the first cavity 23 surrounding the separating unit 80 with a desired volume of consumable liquid (e.g. drinking water). The user may also add ice or ice packs to the consumable liquid in the area of the first cavity 23 surrounding the separating unit 80. The user then closes the first cover 50 which seals against the upper seal 82 of the separating unit 80. The user then fills the food container 70 with a desired number of food items (e.g. sandwiches) that they prefer to remain dry but yet cooled. Once the food container 70 is filled, the door 76 is closed and the food container 70 is lowered into the separating unit 80 via the first access opening 56 within the first cover 50 and the upper opening within the separating unit 80. The ice will both cool the consumable liquid and also the interior of the separating unit 80 including the food items in the food container 70. Beverage containers and other food items that are acceptable to be wet are then placed in the second cavity 25 with ice or ice packs. The second cover 60 is then closed upon the second cavity 25 and the cooler may be transported to a desired location using the telescoping handle 30 and wheels 24 (or carried). Alternatively, the cooler may be secured to a moving object 10 such as an ATV by attaching the elongated fasteners 12 within the notches 40, 42, 44, 46 of the housing 20 and then securing the ends of the elongated fasteners 12 to the rear rack of the ATV as illustrated in FIG. 3. Once the cooler is in the desired location, the food items may be accessed by lifting up on the upper handle 78 of the food container 70 which may pivot upwardly as shown in FIGS. 11 and 12. The door 76 is opened to provide access to the food items within the food container 70 and then the food container 70 may be replaced within the separating unit 80. If the user desires a beverage container or other food item from the second cavity 25, the second cover 60 is opened to provide access and removal of the same. If the user desires to dispense a portion of the liquid within the portion of the first cavity 23 surrounding the separating unit 80, the user manipulates the spigot 28 into the open state thereby allowing the liquid to flow from the first cavity 23 outwardly through the spigot 28 into a different container (e.g. glass, mug) for consumption by the user.

Unless otherwise defined, all technical and scientific terms used herein have the same meaning as commonly understood by one of ordinary skill in the art to which this invention belongs. Although methods and materials similar to or equivalent to those described herein can be used in the practice or testing of the food and beverage cooler system, suitable methods and materials are described above. All publications, patent applications, patents, and other references mentioned herein are incorporated by reference in their entirety to the extent allowed by applicable law and regulations. The food and beverage cooler system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:
1. A cooler, comprising:
a housing having a floor, a front wall extending upwardly from a front portion of the floor, a rear wall extending upwardly from a rear portion of the floor, a left wall extending upwardly from a left portion of the floor between the front wall and the rear wall, and a right wall extending upwardly from a right portion of the floor between the front wall and the rear wall;
an upper edge is formed the front wall, the rear wall, the left wall and the right wall, wherein the upper edge is substantially rectangular shaped, and wherein the upper edge defines an upper opening within the housing that is fluidly connected to a cavity within the housing;
wherein the cavity is formed by the floor, the front wall, the rear wall, the left wall and the right wall;
wherein the cavity is sealed to prevent leakage of fluids from the cavity;
a cover adapted to selectively close and open the upper opening of the housing;
wherein the housing includes a first corner portion between the front wall and the left wall, a second corner portion between the front wall and the right wall, a third corner portion between the rear wall and the left wall, and a fourth corner portion between the rear wall and the right wall;

a first notch extending inwardly and downwardly from the first corner portion, wherein the first notch defines a first opening at the first corner portion, wherein the first notch is adapted to receive a portion of an elongated fastener through the first opening into the first notch;

a second notch extending inwardly and downwardly from the second corner portion, wherein the second notch defines a second opening at the second corner portion, wherein the second notch is adapted to receive a portion of an elongated fastener through the second opening into the second notch;

a third notch extending inwardly and downwardly from the third corner portion, wherein the third notch defines a third opening at the third corner portion, wherein the third notch is adapted to receive a portion of an elongated fastener through the third opening into the third notch; and a fourth notch extending inwardly and downwardly from the fourth corner portion, wherein the fourth notch defines a fourth opening at the fourth corner portion, wherein the fourth notch is adapted to receive a portion of an elongated fastener through the fourth opening into the fourth notch.

2. The cooler of claim 1, wherein the cover is pivotally connected to the housing.

3. The cooler of claim 2, wherein the cover is pivotally connected to the rear wall by a hinge.

4. The cooler of claim 1, wherein the notches each are positioned within an upper portion of the housing.

5. The cooler of claim 4, wherein the notches are positioned at the same height on the housing.

6. The cooler of claim 1, wherein the notches each extend inwardly into the housing in a substantially horizontal manner.

7. The cooler of claim 1, wherein the notches each have a lower portion, wherein the lower portion extends inwardly and downwardly.

8. The cooler of claim 1, wherein the notches each are tapered.

9. The cooler of claim 1, wherein the notches each have a substantially U-shaped structure.

10. The cooler of claim 1, wherein the notches each have an inner portion, wherein the inner portion is rounded.

11. The cooler of claim 1, wherein the notches each have an inner portion and a lower portion, wherein the inner portion is rounded and wherein the lower portion extends inwardly and downwardly to the inner portion.

12. The cooler of claim 1, wherein the notches each have an inner portion, a lower portion and an upper portion, wherein the inner portion is rounded and wherein the lower portion and the upper portion both extend inwardly and downwardly to the inner portion.

13. The cooler of claim 12, wherein the notches each are tapered.

14. The cooler of claim 1, wherein the notches form a lower lip that catchably receives a portion of an elongated fastener.

15. The cooler of claim 1, wherein the notches each have the same structure.

16. The cooler of claim 1, wherein the notches are integrally formed within the housing.

17. The cooler of claim 1, wherein the first notch extends into the front wall and the left wall, wherein the second notch extends into the front wall and the right wall, wherein the third notch extends into the rear wall and the left wall, and wherein the fourth notch extends into the rear wall and the right wall.

18. The cooler of claim 1, comprising a divider wall extending from the front wall to the rear wall within the cavity, wherein the divider wall splits the cavity into a first cavity and a second cavity, and wherein the divider wall splits the upper opening into a first upper opening and a second upper opening corresponding to the first cavity and second cavity respectively.

19. The cooler of claim 18, comprising:

wherein the cover is comprised of a first cover and a second cover, wherein the first cover selectively closes and opens the first upper opening, wherein the second cover selectively closes and opens the second upper opening, and wherein the first cover moves independently of the second cover;

a first access opening extending through the first cover; and a food container removably extending through the first access opening into the first cavity of the housing.

20. A cooler, comprising:

a housing having a floor, a front wall extending upwardly from a front portion of the floor, a rear wall extending upwardly from a rear portion of the floor, a left wall extending upwardly from a left portion of the floor between the front wall and the rear wall, and a right wall extending upwardly from a right portion of the floor between the front wall and the rear wall;

an upper edge is formed the front wall, the rear wall, the left wall and the right wall, wherein the upper edge is substantially rectangular shaped, and wherein the upper edge defines an upper opening within the housing that is fluidly connected to a cavity within the housing;

wherein the cavity is formed by the floor, the front wall, the rear wall, the left wall and the right wall;

wherein the cavity is sealed to prevent leakage of fluids from the cavity;

a cover adapted to selectively close and open the upper opening of the housing;

wherein the housing includes a first corner portion between the front wall and the left wall, a second corner portion between the front wall and the right wall, a third corner portion between the rear wall and the left wall, and a fourth corner portion between the rear wall and the right wall;

a first notch extending inwardly and downwardly from the first corner portion, wherein the first notch defines a first opening at the first corner portion, wherein the first notch is adapted to receive a portion of an elongated fastener through the first opening into the first notch;

a second notch extending inwardly and downwardly from the second corner portion, wherein the second notch defines a second opening at the second corner portion, wherein the second notch is adapted to receive a portion of an elongated fastener through the second opening into the second notch;

a third notch extending inwardly and downwardly from the third corner portion, wherein the third notch defines a third opening at the third corner portion, wherein the third notch is adapted to receive a portion of an elongated fastener through the third opening into the third notch; and a fourth notch extending inwardly and downwardly from the fourth corner portion, wherein the fourth notch defines a fourth opening at the fourth corner portion, wherein the fourth notch is adapted to receive a portion of an elongated fastener through the fourth opening into the fourth notch;

wherein the first notch extends into the front wall and the left wall, wherein the second notch extends into the front wall and the right wall, wherein the third notch extends into the rear wall and the left wall, and wherein the fourth notch extends into the rear wall and the right wall;

wherein the notches each have an inner portion and a lower portion, wherein the inner portion is rounded and wherein the lower portion extends inwardly and downwardly to the inner portion;

wherein the notches are integrally formed within the housing;

a divider wall extending from the front wall to the rear wall within the cavity, wherein the divider wall splits the cavity into a first cavity and a second cavity, and wherein the divider wall splits the upper opening into a first upper opening and a second upper opening corresponding to the first cavity and second cavity respectively;

wherein the cover is comprised of a first cover and a second cover, wherein the first cover selectively closes and opens the first upper opening, wherein the second cover selectively closes and opens the second upper opening, and wherein the first cover moves independently of the second cover;

wherein the first cover is pivotally attached to the rear wall of the housing;

wherein the second cover is pivotally attached to the rear wall of the housing;

a first access opening extending through the first cover; and a food container removably extending through the first access opening into the first cavity of the housing.

* * * * *